(12) United States Patent
Canfield et al.

(10) Patent No.: US 8,310,369 B1
(45) Date of Patent: Nov. 13, 2012

(54) DETECTING UNINTENDED FLUSH TOILET WATER FLOW

(75) Inventors: Eric L. Canfield, Chester Springs, PA (US); Edward P. Cheslock, Delta, PA (US)

(73) Assignee: nth Solutions, LLC, Exton, PA (US)

( * ) Notice: Subject to any disclaimer, the term of this patent is extended or adjusted under 35 U.S.C. 154(b) by 0 days.

(21) Appl. No.: 12/748,793

(22) Filed: Mar. 29, 2010

Related U.S. Application Data

(60) Provisional application No. 61/164,191, filed on Mar. 27, 2009.

(51) Int. Cl.
  *G08B 21/00* (2006.01)
  *E03D 1/00* (2006.01)

(52) U.S. Cl. .................. 340/605; 4/314; 4/415

(58) Field of Classification Search .................. 340/605; 4/314, 415
See application file for complete search history.

(56) References Cited

U.S. PATENT DOCUMENTS

| | | | |
|---|---|---|---|
| 265,709 A | 10/1882 | Sniffen |
| 1,984,394 A | 12/1934 | Candee |
| 2,375,084 A | 5/1945 | Coroniti et al. |
| 2,837,111 A | 6/1958 | Mueller |
| 2,841,169 A | 7/1958 | Martin et al. |
| 3,095,577 A | 7/1963 | Clark |
| 3,348,242 A | 10/1967 | Wilhelm |
| 3,363,643 A | 1/1968 | Skulski |
| 3,401,717 A | 9/1968 | Lamb |
| 3,419,912 A | 1/1969 | Kertell |
| 3,619,821 A | 11/1971 | Bobo |
| 3,930,556 A | 1/1976 | Kusuda et al. |
| 3,933,042 A | 1/1976 | Rector et al. |
| 4,110,849 A | 9/1978 | La Faver |
| 4,203,173 A | 5/1980 | Morris et al. |
| 4,216,555 A | 8/1980 | Detjen |
| 4,289,019 A | 9/1981 | Claytor |
| 4,296,505 A | 10/1981 | Chien-Sheng |
| 4,351,071 A | 9/1982 | Clar |
| 4,391,003 A | 7/1983 | Talerico et al. |
| 4,402,093 A | 9/1983 | Luker et al. |
| 4,407,026 A | 10/1983 | Myers |
| 4,455,863 A | 6/1984 | Huebler et al. |
| 4,485,501 A | 12/1984 | Kloner |

(Continued)

FOREIGN PATENT DOCUMENTS

GB   488402   7/1938

(Continued)

OTHER PUBLICATIONS

Fluidmaster Whisper With Leak Sentry Toilet Fill Valve, photos and instruction sheet (Jan. 2005).

(Continued)

*Primary Examiner* — Albert Wong
*Assistant Examiner* — Jerold Murphy
(74) *Attorney, Agent, or Firm* — Nixon & Vanderhye P.C.

(57) ABSTRACT

Water is conserved by detecting unintended inflow of water into the tank of a flush toilet. A sensor acoustically and/or vibrationally coupled to the flush toilet detects sound and/or vibration generated due to turbulence in water flowing into the toilet tank. An electronic circuit analyzes the sensor output to detect cyclical water inflow not intended by a user. The electronic circuit generates an alert such as an audible and/or visual indication that the toilet is leaking.

37 Claims, 29 Drawing Sheets

U.S. PATENT DOCUMENTS

| | | | |
|---|---|---|---|
| 4,498,203 A | 2/1985 | Barnum et al. | |
| 4,538,307 A | 9/1985 | Barnum et al. | |
| 4,543,817 A | 10/1985 | Sugiyama | |
| 4,547,768 A | 10/1985 | Kulhavy | |
| 4,654,646 A | 3/1987 | Charboneau | |
| 4,656,464 A | 4/1987 | Cliffgard | |
| 4,674,329 A | 6/1987 | Mulder | |
| 4,700,413 A | 10/1987 | Lopez | |
| 4,791,689 A | 12/1988 | Garcia De Couto | |
| 4,804,947 A | 2/1989 | Geleziunas | |
| 4,841,282 A | 6/1989 | Reis | |
| 4,843,657 A | 7/1989 | Orr | |
| 4,850,223 A | 7/1989 | Carlin et al. | |
| 4,858,462 A | 8/1989 | Coulter et al. | |
| 4,901,377 A | 2/1990 | Weir | |
| 5,058,421 A | 10/1991 | Alexander et al. | |
| 5,062,166 A | 11/1991 | Krenecki | |
| 5,083,323 A | 1/1992 | Cannan | |
| RE33,977 E | 6/1992 | Goodman et al. | |
| 5,117,676 A | 6/1992 | Chang | |
| 5,134,876 A | 8/1992 | Robertson et al. | |
| 5,159,318 A | 10/1992 | Kronberg | |
| 5,230,104 A | 7/1993 | Ocampo | |
| 5,231,866 A | 8/1993 | Peacock | |
| 5,232,011 A | 8/1993 | Royalty | |
| 5,240,022 A * | 8/1993 | Franklin | 137/1 |
| 5,327,931 A | 7/1994 | Royalty et al. | |
| 5,416,724 A | 5/1995 | Savic | |
| 5,524,299 A | 6/1996 | Dalfino | |
| 5,533,383 A | 7/1996 | Greene et al. | |
| 5,603,127 A * | 2/1997 | Veal | 4/246.1 |
| 5,647,068 A | 7/1997 | Jensen | |
| 5,675,506 A | 10/1997 | Savic | |
| 5,703,569 A | 12/1997 | Oliver et al. | |
| 5,940,899 A | 8/1999 | Mankin et al. | |
| 6,032,303 A | 3/2000 | Schmidt | |
| 6,058,519 A | 5/2000 | Quintana | |
| 6,178,569 B1 | 1/2001 | Quintana | |
| 6,237,412 B1 | 5/2001 | Morimoto | |
| 6,269,694 B2 | 8/2001 | Morimoto | |
| 6,423,213 B1 | 7/2002 | Mazurek | |
| 6,776,900 B2 | 8/2004 | Mazurek et al. | |
| 6,877,170 B1 | 4/2005 | Quintana et al. | |
| 6,934,977 B1 | 8/2005 | Quintana et al. | |
| 6,937,155 B2 | 8/2005 | Ballard | |
| 7,111,638 B2 | 9/2006 | Johnson | |
| 7,396,000 B2 | 7/2008 | Parsons et al. | |
| 7,636,959 B2 * | 12/2009 | Bowcutt et al. | 4/427 |
| 7,650,652 B2 | 1/2010 | Schuster et al. | |
| 2003/0145371 A1 * | 8/2003 | Ghertner et al. | 4/427 |
| 2004/0199989 A1 | 10/2004 | Trolio | |
| 2005/0109682 A1 | 5/2005 | Mazurek et al. | |
| 2005/0133754 A1 | 6/2005 | Parsons et al. | |
| 2005/0248465 A1 * | 11/2005 | Flaherty | 340/605 |
| 2006/0059612 A1 | 3/2006 | Orcutt | |
| 2006/0168716 A1 | 8/2006 | Schuster et al. | |
| 2006/0168717 A1 * | 8/2006 | Schuster et al. | 4/415 |
| 2007/0008111 A1 * | 1/2007 | Tice et al. | 340/539.12 |
| 2007/0027579 A1 * | 2/2007 | Suzuki et al. | 700/245 |
| 2007/0125429 A1 | 6/2007 | Kandl | |
| 2008/0309503 A1 * | 12/2008 | White et al. | 340/606 |
| 2009/0194719 A1 * | 8/2009 | Mulligan | 251/129.01 |
| 2010/0206039 A1 * | 8/2010 | Kates | 73/1.01 |

FOREIGN PATENT DOCUMENTS

| | | |
|---|---|---|
| GB | 2218812 A | 11/1989 |
| JP | 63117222 | 5/1988 |

OTHER PUBLICATIONS

Office Action in U.S. Appl. No. 12/796,437 (Jun. 16, 2011).

Evans, Jim, "Toilet Bowl Refill Port & Tube," "How a Toilet Works," http://www.factsfacts.com/MyHomeRepair/toilet_refill.htm, http://www.factsfacts.com/MyHomeRepair/ToiletFlush.htm (Jan. 2005)).

Keating, Kay, "Toiletology 101, Emergencies, Overflowing Toilet Bowl," http://www.toiletology.com/emergenc.shtml (1998).

PlumbingWorld.com, "FlowManager—prevents overflows and leaks," http://www.plumbingworld.com/toiletoverflowmanager.html (Jan. 2005).

"AquaOne FlowManager Toilet Overflow Detection," http://www.comfortchannel.com/prod.itml/icOid/1806, copyright 2005-2008.

Fluidmaster Inc., "400A Fill Valve Installation Instructions," www.fluidmaster.com (Dec. 2003).

McGinn, Daniel, "The King of Thrones," WIRED 13.03 http://www.wired.com/wired/archive/13.03/toilet.html?pg=1&topic=toilet&topic_set= (Mar. 2005).

* cited by examiner

Example Installation

Example Detection Mode

Prior Art Example Toilet

Example Toilet Intended Flush Operation -
Handle Pressed to Initiate Flush

Example Toilet Intended Flush Operation - Flapper Open

Example Toilet Bowl Evacuation

Example Toilet Refilling After
Intended Flush Operation - Fill
Valve Open

Example Flapper Leak

Example Flapper Leak

Example Toilet Refilling Due to Unintended Fill Valve Action - Fill Valve Open

Example Electrical Block Diagram

Example Software Flowchart

Example Software Flowchart

Example Software Flowchart

Example Software Flowchart

Example Electrical Circuit Diagram

Example Electrical Circuit Diagram

Example Unfiltered Amplified Sensor Output -
Higher Pressure Higher Flow

Example Spectral Power Bandwidth
Response of Amplified Sensor Output

Example Unfiltered Amplified Sensor Output -
Lower Pressure Lower Flow

Example Spectral Power Bandwidth
Response of Amplified Sensor Output

Example Unfiltered Amplified Sensor Output of
Urine Striking Toilet Bowl Water Surface Example Spectral Power Bandwidth
Response of Urine Striking Water Surface Example Unfiltered Analog Impulse Response Due to Brief Hard Contact Example Spectral Power Bandwidth
Response of Brief Hard Contact Example Filtered Analog Signal of Higher Pressure Higher Flow Example Filtered Analog Signal of Lower
Pressure Lower Flow

DETECTING UNINTENDED FLUSH TOILET WATER FLOW

CROSS-REFERENCES TO RELATED APPLICATIONS

This application claims the benefit of provisional application No. 61/164,191 filed Mar. 27, 2009, entitled "Apparatus and Methods For Detecting Leaks and Preventing or Reducing Waste of Water", incorporated herein by reference. This application is related to copending commonly-assigned U.S. patent application Ser. No. 12/748,853 entitled "A Self-Stick Resonant Enclosure That Responds to Flush Toilet Fill Valve Water Inflow Vibration" filed on Mar. 29, 2010, also incorporated by reference herein.

STATEMENT REGARDING FEDERALLY SPONSORED RESEARCH OR DEVELOPMENT

N/A

FIELD

The technology herein relates to apparatus, methods and techniques that can be used to detect leaking toilets and/or prevent the unnecessary waste of water. More specifically, the technology herein relates to method and apparatus for detecting unintended cyclical and other operation of a flush toilet by analyzing sensed acoustical and/or vibrational energy.

BACKGROUND AND SUMMARY

As water conservation continues to grow as a national and global concern, it is becoming abundantly clear that reduction in water usage and eliminating waste is an important national and global objective. Although the US population is increasing daily, the aquifers that supply potable water do not necessarily replenish according to demand. In some cases, up to 20% of the nation's population may experience moderate to extreme drought conditions at any point time. It is possible that many more will routinely experience significant drought levels in the future. Added to the population growth and limited replenishing of the aquifers, water utility infrastructures are already being stressed beyond their designed capacity while private wells often can run dry.

Toilets leaks that waste precious water have plagued us for years. While modern toilets are generally very reliable, they can and do malfunction from time to time. Perhaps the most common malfunction is when the so-called "flapper" (the rubber or other "flap" that controls the exit of water from the tank into the bowl) remains open, leaks or is misaligned. A stuck-open flapper can waste a lot of water. Sometimes the fix is as simple as jiggling the flush handle. Other times, it is necessary to replace the flapper.

Although often difficult to see and identify, a leaking flapper can sometimes be detected by observing a slight flow of water from the rim holes into the toilet bowl. It is also sometimes possible to detect the flapper's failure to close by listening for water running or trickling continuously into the tank, or for the periodic activation of the fill valve. People who are hearing-impaired may not be able to hear the water running. More modern toilets are often so quiet in their operation that a leak is audibly undetectable. Reasons that account for so many leaking toilet flappers thus include people not hearing the toilet "run" or failing to visually observe the water flowing from the bowl rim holes into the bowl. Even when these conditions are observed, the observer does not always conclude that there is a problem, or that water is even being wasted. There are many people who have paid high water bills for years, believing the bills to be normal.

On the shelves of hardware stores and do-it-yourself home supply centers, you can find up to a dozen different types of replacement flappers, many touted as being "universal", to address this very common problem. Water utilities often acknowledge that the number-one reason for high water bills to home owners is due to leaking toilet flappers. When customer service representatives of these water utilities receive a call about a high water bill, it is common for them to automatically send out dye packs or food coloring for the customer to put inside the toilet tank. If the flapper is leaking, the dye or food coloring should be visible in the toilet bowl after a short period of time. This is a simple and effective way to detect leaky flappers, but often much water has been wasted (with corresponding cost or well run dry) by the time the problem is discovered and diagnosed.

Leaking toilet flappers are not an isolated problem. In fact, without routine maintenance, it isn't a question of "if" a toilet is going to leak, but "when". There are over 250 million toilets in the United States. It is estimated that up to 20% are leaking at any point in time because of deteriorated, faulty, or improperly seated flappers. Some studies show that the average leaking toilet wastes 100 gallons per day or more, suggesting a total nationwide daily waste of over 5 billion gallons, or nearly 2 trillion gallons per year. This problem is not limited to the United States. Unpressurized tank-based toilets that use flappers are common around the world as are other toilet designs that can leak.

Not surprisingly, there have many previous attempts at devices that will detect leaking toilet flappers or prevent toilets from leaking. Yet, very few of these have ever resulted in successfully commercialized products. Most are not practical, too complicated for the average home owner to install, or too expensive. Some require the entire toilet to be replumbed. Others require replacement of internal toilet components. Still others don't provide helpful feedback to the user. Just as there are those who will not change or add oil in their cars until the red "OIL" light illuminates on their dashboards, some people will not replace or fix their toilet flapper unless there is something that indicates the desirability to do so. When it comes to simple routine maintenance, many of us benefit from being advised what to do and when to do it.

There is thus a long felt but unsolved need for an effective and non-invasive way to automatically detect leakage or other unintended operation of a flush toilet and provide an alert to prompt the user to take corrective action.

Exemplary illustrative non-limiting implementations herein electronically monitor a toilet and provide visual and/or audible notification when the toilet is leaking.

One exemplary illustrative non-limiting implementation electronically monitors the sound, vibration and/or noise generated by a toilet during its operation and provides an alert such as a visual and/or audible notification to inform a user or other entity when there is a leak.

An exemplary method of detecting unintended inflow of water into the tank of a flush toilet can comprise measuring durations between water inflows into the toilet tank; processing said durations; and based at least in part on said processing, determining when water inflow into said toilet tank is not initiated by flushing said toilet but is instead the result of cyclic periodic unintended fill valve operation due to a leak.

An exemplary illustrative non-limiting implementation provides a new and useful single self-contained non-contact water flow monitoring apparatus, capable of being located anywhere on the inside or outside of a tank and flapper-based or other toilet, mounted within seconds and without tools, while automatically modeling and monitoring the water flow characteristics of the toilet. An exemplary device requires no user or factory calibration or input, and is inexpensive to mass produce. It can determine if the flapper is leaking, and how frequently the fill valve action occurs in response to the leak; and estimate the amount of water being wasted accordingly. It can also detect intermittent or non-continuous leaks.

A leaking flapper will produce a drop in the water level inside the toilet tank, causing the fill valve float (or pressure sensor) to activate, which can usually last several seconds. This phenomenon is often referred to as a "phantom flush". As the flapper continues to leak, this process repeats itself. When a fill valve action occurs (phantom flush or actual flush), water is forced into the tank at a rate that is a function of the water pressure, toilet feed-valve, and the ports of the fill valve itself. The pressurized water produces turbulence inside the tank, which in turn produces vibration. The exemplary implementation can identify and isolate the vibration signature of a fill valve action and qualify it as either a normal flush cycle or a refill action in response to a leaking flapper.

Exemplary illustrative non-limiting technology herein, for use with a tank-based toilet that utilizes a flapper and fill valve, detects, analyzes, and responds to translational and/or acoustic vibration from the water turbulence produced by a fill valve action within the toilet tank, or lack thereof, of the fill valve. Some newer fill valves do not use floats—they mount on the tank bottom and operate with respect to pressure. These fill valves still employ a flapper as part of the system. The exemplary illustrative non-limiting technology herein can be used with all such toilet designs.

One optimal and beneficial exemplary illustrative implementation provides an inexpensive product for detecting leaking toilets that takes into account the fact that there are dozens of different types of toilets; end-users ranging from very young to very old, with varying physical and mental capabilities; countless environmental disparities (e.g., everything from single homes to high rise apartments); and occasionally, a predisposition towards not reading instructions. Simplicity is a worthy objective.

Such detection and analysis can for example in one exemplary illustrative non-limiting implementation provide easy-to-understand audio and/or visual or other user-perceptible feedback such as (1) the toilet is operating normally or (2) the toilet is leaking. Exemplary illustrative non-limiting devices can also or in addition provide and/or record information such as the number of times said toilet is flushed; the estimated water volume associated with each flush and the total cumulative volume.

One exemplary illustrative non-limiting method includes providing radio frequency, hard-wired, direct interface, or other telemetry for the purpose of data transmission and/or control of external devices and/or systems.

Exemplary illustrative non-limiting installation includes attaching the device by use of adhesive to the inside or outside surface of the tank, or by use of a flexible hinge or hanger, or manually snapping as an assembly onto the fill valve cap, or mechanically coupled to any water line feeding the toilet or toilets to be monitored, or other methods.

A further exemplary illustrative non-limiting device for use with a tank and flapper-based toilet can integrated with an additional attaching structure for manual attachment to the fill valve cap. A support mechanism supported by an attaching structure can act to conditionally interfere with the operation of the toilet tank fill valve assembly to prevent overflows and/or water waste in response to leak detection. See commonly assigned U.S. patent application Ser. No. 12/036,629 filed Feb. 25, 2008 (now U.S. Pat. No. 7,757,708) entitled "Toilet Bowl Overflow Prevention and Water Conservation System and Method" incorporated herein by reference.

A desirable design objective for the exemplary non-limiting implementation is simplicity of installation and use. Achieving that objective without any user setup or calibration can be accomplished by unique sensor technology and a correspondingly complex mathematical process that allows the product to be placed on virtually any tank and flapper based or other toilet (there are hundreds of different models), accounting for dozens of different types of fill valves, flappers, and variations in water pressure (even on the same toilet), while simultaneously ignoring external noise, incidental bathroom disturbances and all kinds of interference.

Because vibration signature is different from toilet to toilet, the exemplary non-limiting implementation first "learns" its environment. After attaching the product to the toilet and pulling the battery activation tab, the user is instructed to flush the toilet. The exemplary implementation senses and records characteristics of the noise and/or vibration during this flush and following refill operation and, in response thereto, mathematically models the toilet as a function of the vibration due to water turbulence, committing the "flush signature" to memory. The "flush signature" is used to help determine other toilet characteristics, such as whether or not the flapper is leaking. The modeled flush signature is also used to determine when an actual flush is taking place so the user can be alerted upon completion of the flush cycle.

Depending upon what data is modeled when the unit is first installed, and given the actual normal use of the toilet and any associated background noise, it can take some time (e.g., up to 48 hours) to "learn" and fully model the toilet and respond accordingly to leaks. However, in many instances, the exemplary implementations can mathematically model the toilet and detect leaks in just a few hours.

Additional features and advantages of non-limiting exemplary illustrative implementations include:

Environmentally friendly—protects the environment by conserving water and eliminating water waste Low cost Easy to deploy Attending to leaks can save money Installs in seconds—No tools required Fully Automatic—No set up necessary Works on any toilet Visual and/or audible alerts Small, sleek design High sensitivity—detects even leaks you cannot see or hear Detects vibration, sound and/or noise the toilet generates during operation (e.g., from turbulence when fill valve open)

Detects leakage based on water inflow using non-contacting sensing techniques

Dynamically adaptable to changing conditions

Uses statistical analysis and modeling techniques to analyze toilet characteristics Able to effectively detect even intermittent leaks Conserves battery life so device can remain in operation for many months without battery replacement Same transducer can be shared between sensing and annunciating operations, thereby saving cost No user input required—fully automatic operation Easy Peel/Place/Pull installation Directly acousto-mechanically coupled to toilet Non-contact—no need to contact water or interfere with water inflow or outflow No plumbing required Non-invasive: no modification of toilet or toilet components required Senses wide spectrum noise generated by water turbulence within the toilet Can use an inexpensive rugged low power sensor such as a piezo-electric vibration sensor Mathematically models toilet operation Compares current operation with baseline to detect abnormalities Learn mode detects/records characteristics of a particular toilet Sleep mode conserves power Can provide status when toilet is flushed Can provide status periodically to inform user that unit is operating Some implementations allow users to provide control inputs; other implementations provide completely automatic operation requiring and/or accepting no user inputs Display can be complex or simple; some implementations display detailed information, other implementations provide simple status display such as Green (unit functioning properly), Red (toilet is leaking and requires attention), Yellow (battery low)

Other indications and/or alerts are possible

Leak indication can be provided periodically (e.g., every 20 seconds) when a leak has recently been detected (e.g., within the last 24 hours) and/or after user-initiated or other flushes Leak indication can be provided with less frequency if leak has been detected but not so recently (e.g., audible indication approximately every three hours if a leak has not been corrected within 72 hours after detection)

Can provide periodic indication when battery needs replacement

Some implementations provide field-replaceable batteries, other implementations are sealed units do not allow field replacement of batteries; others use alternative power sources Can be located outside, inside or within toilet tank or other structure Can be installed on a toilet in the field or at time of manufacture Other

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
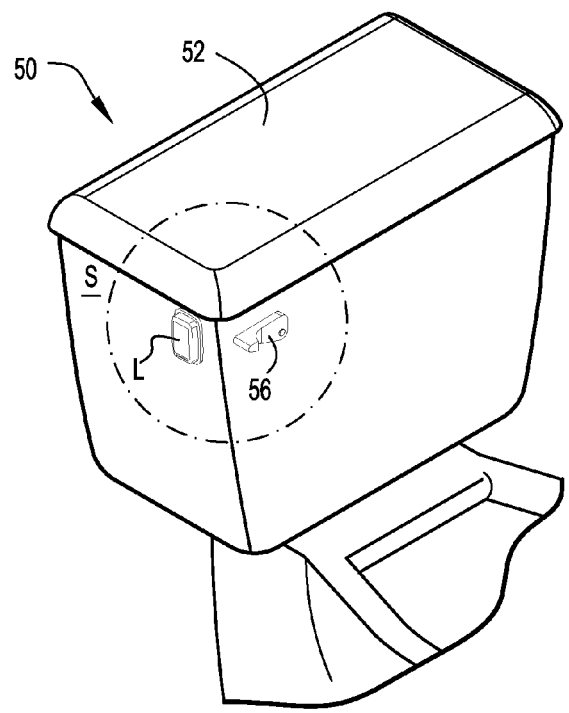
FIG. 1 is an upper-corner front-facing view of a toilet and one example mounting location for an exemplary illustrative non-limiting leak detector L.
Figure 1A:
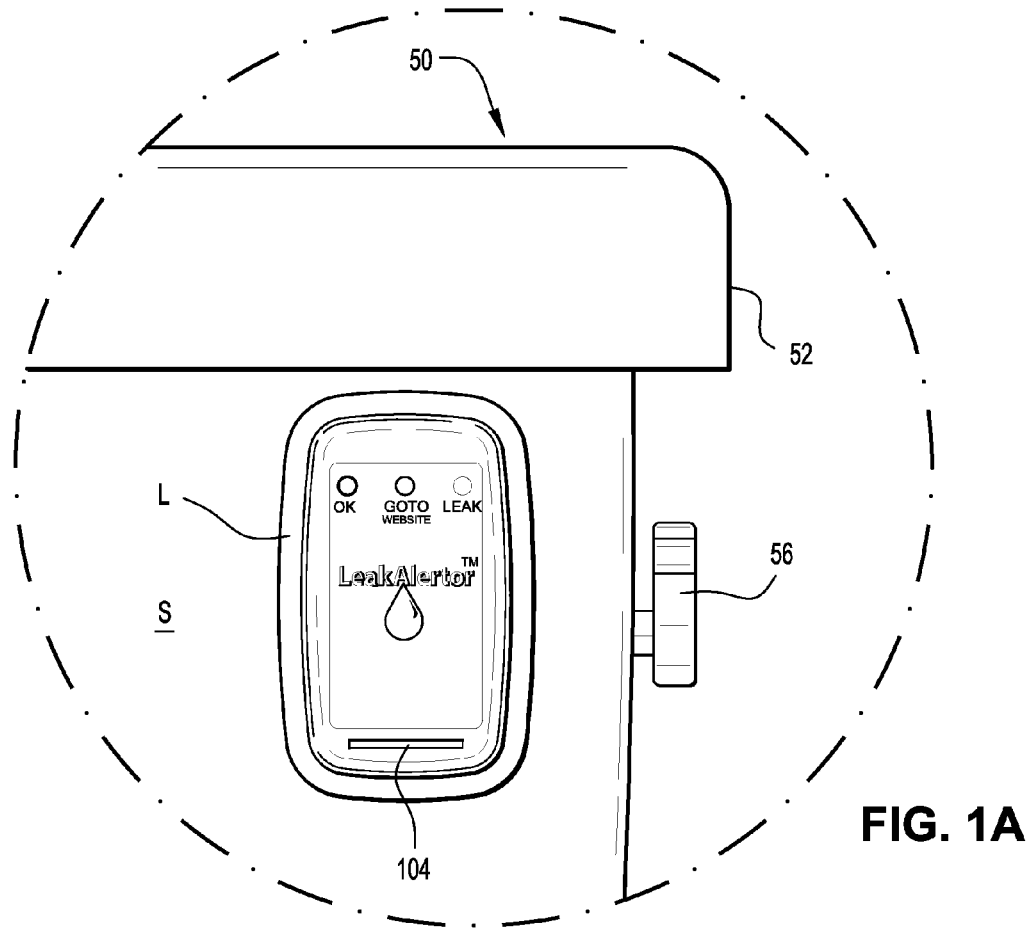
FIG. 1A shows the top of a toilet tank and one example mounting location for the exemplary illustrative non-limiting leak detector L.

FIGS. 1 and 1A show an exemplary illustrative non-limiting leak detector L that can be used to detect leakage or waste of water due to unintended fill operations of a flush toilet 50 or other fluid handling device.

Leak detector L in the exemplary illustrative non-limiting implementation can be mounted on the outside of a toilet 50. Toilet 50 can be any type of conventional toilet including but not limited to a conventional flush type toilet including flapper and fill valve as will be described in greater detail below. Leak detector L can be placed anywhere desired on or off the toilet 50 such that it is acoustically or vibrationally coupled to the toilet, e.g., through direct contact, through the air, through other structures, etc. In one example implementation, for example, leak detector L is adhered to the porcelain surface on the outside of a tank 52 of toilet 50.

Figure 2:
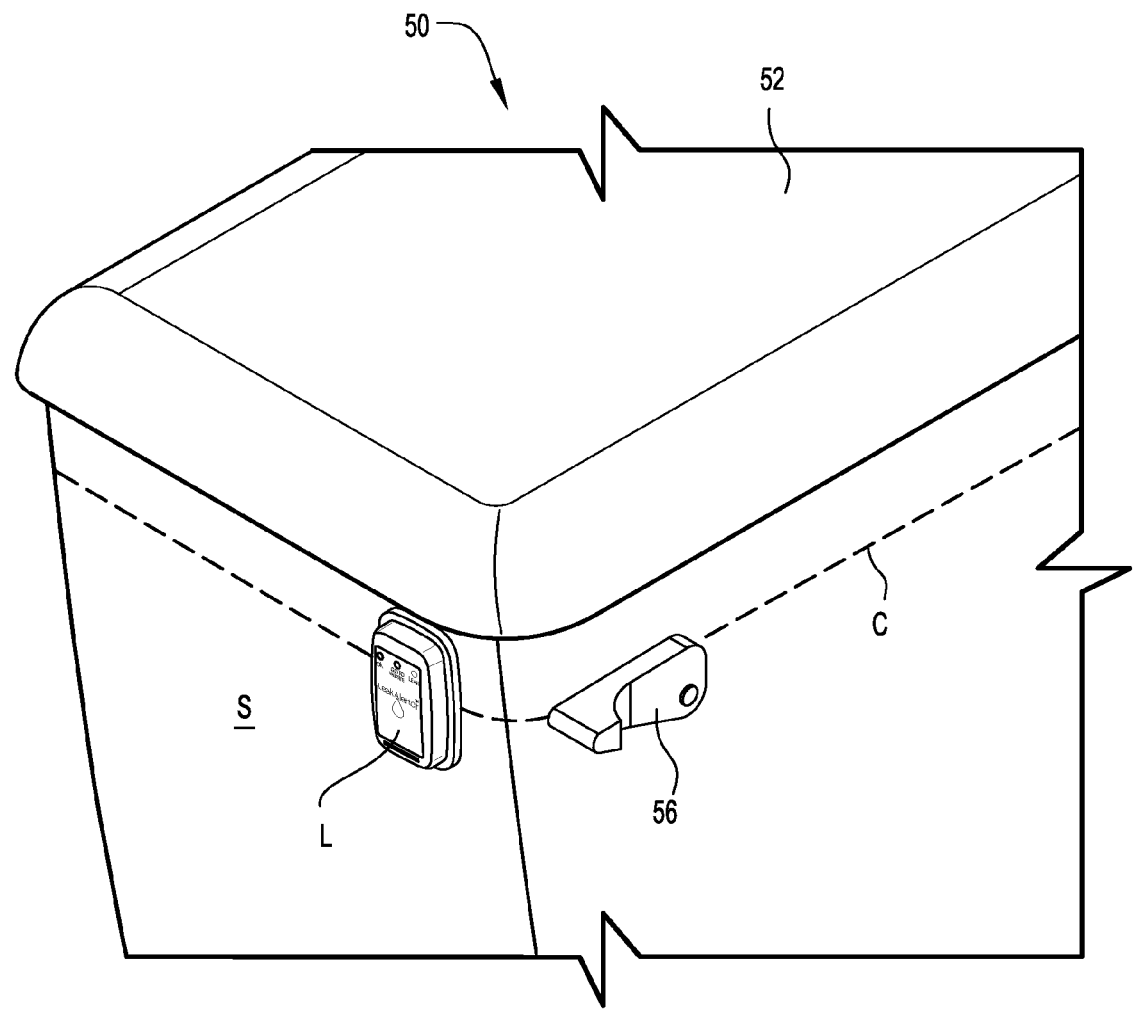
FIG. 2 shows an exemplary illustrative view of an example mounting location for the illustrative leak detector L along an example circumference of a toilet tank.

In one exemplary illustrative non-limiting implementation, the leak detector L is mounted on a particular circumference a few inches below the top of the toilet tank 52 (see FIG. 2). In the exemplary illustrative non-limiting implementation, there is no need to couple the leak detector L directly or indirectly to the flush handle 56 nor is there any need for the leak detector L to be in contact with water or other fluid within or outside of the tank 52. Rather, the exemplary illustrative non-limiting leak detector L is non-contacting in the sense that it is not contact with either the water inflow or outflow of the toilet. It is also not in mechanical engagement with the toilet flush handle 56. In one exemplary illustrative non-limiting implementation, the only requirement is that the leak detector L is directly or indirectly able to receive acoustic and/or vibrational energy the toilet 50 generates.

Figure 3A:
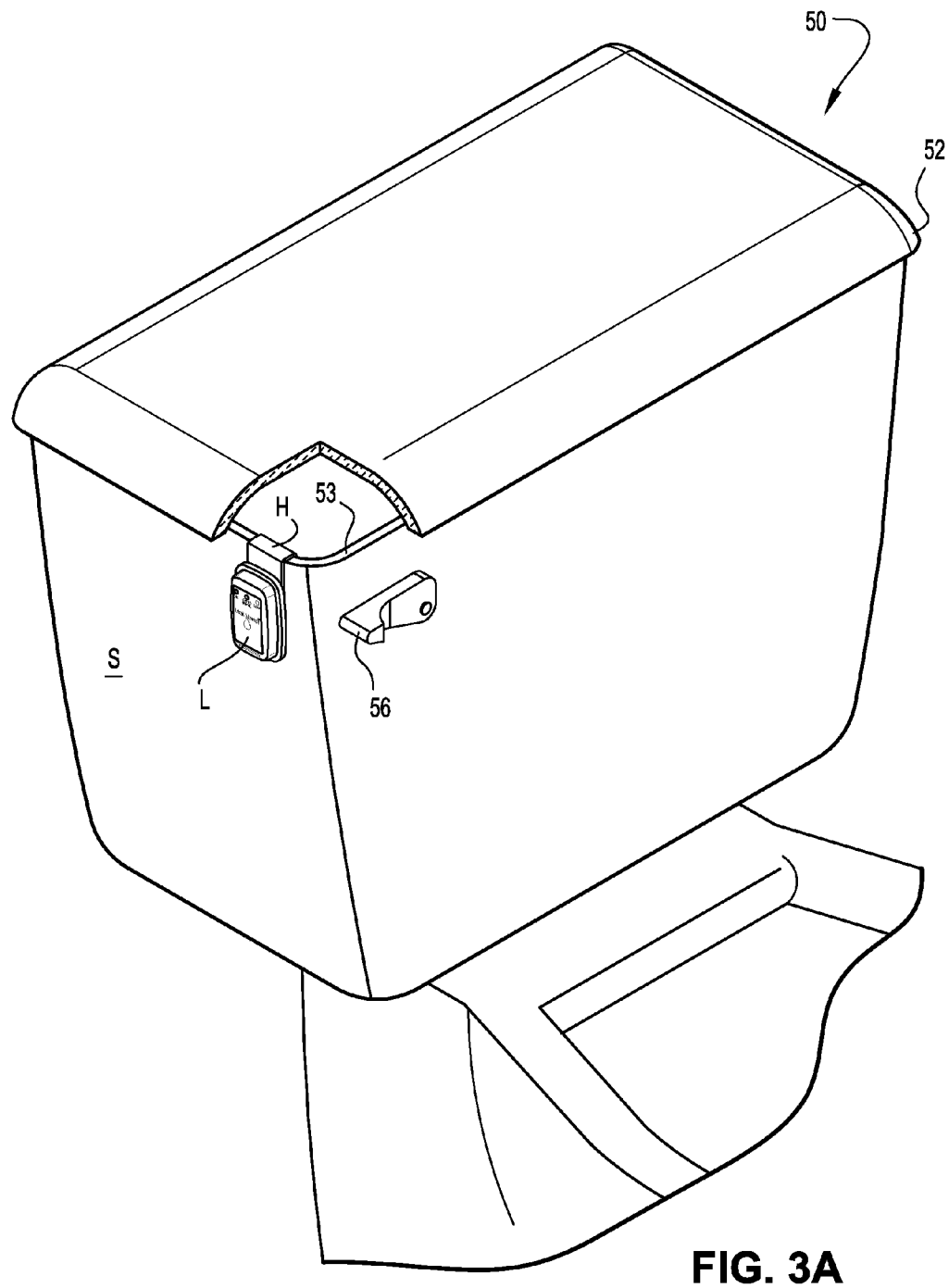
FIG. 3A is a cutaway view of an example conventional prior art toilet tank with the exemplary illustrative non-limiting leak detector L attached in an alternative way by means for example of a hanger placed outside the toilet tank as one possible location.
Figure 3B:
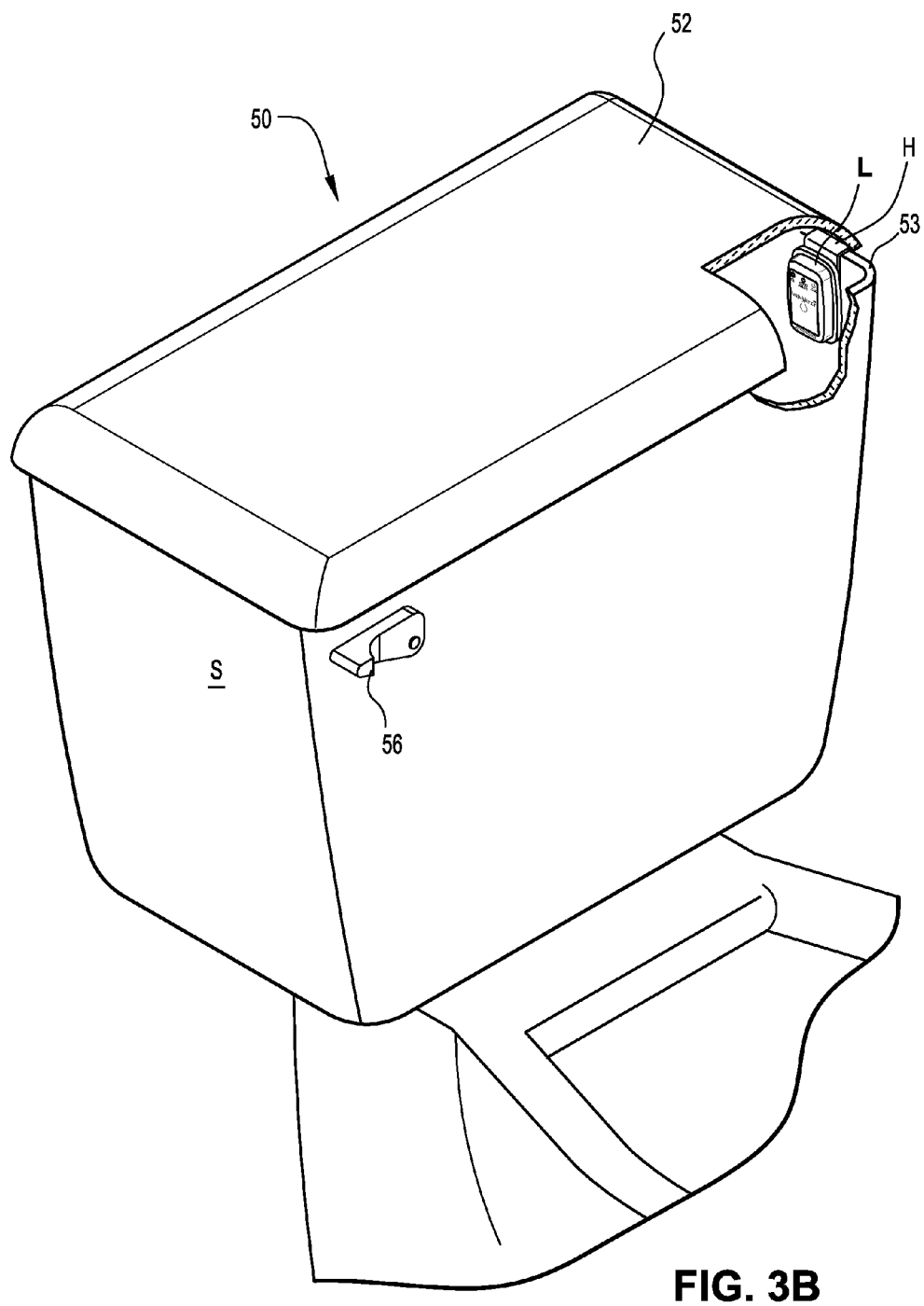
FIG. 3B is a cutaway view of an example conventional prior art toilet tank with the exemplary illustrative non-limiting leak detector L attached in an alternative way by means of a hanger placed inside the toilet tank as one possible location.

Thus, the leak detector L can be mounted on the side of the tank 52 (FIG. 1A), on the top of the tank, underneath the tank, within the tank (see FIG. 3B), on the bowl, on the wall near the toilet 50, or anywhere where it can sense noise and/or vibration the toilet generates. The leak detector L can be attached to the toilet 50 with adhesive tape, hung to the tank using a metal bracket H (see FIGS. 3A, 3B), placed on the top of the tank, or placed or mounted anywhere else as may be desired. FIGS. 3A and 3B show a hanger H that can be bent over the top lip 53 of tank 52. All mounting examples shown are in solid or other contact with tank 52, allowing for translational vibration and/or noise to be detected by the device, but other mounting positions that are not in direct contact with the toilet are also possible and may be desirable in some applications.

Most toilets 50 are exposed to condensation, harsh cleaning agents, and the occasional errant toddler who needs to work on his aim. Except for a downward facing and angled slot for the battery activation tab (to be described below), the exemplary illustrative non-limiting unit has been sealed to fully protect it from liquid and cleaning agents. Even the slot can be eliminated in some applications to provide a completely hermetically sealed design.

Example User Installation and Operating Procedure

Figure 4:
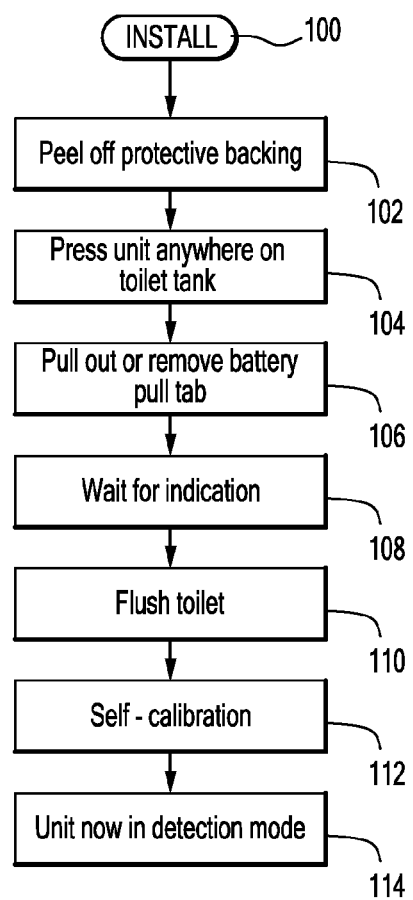
FIG. 4 is a flowchart representing an example method of installing the exemplary illustrative non-limiting leak detector L.
Figure 8A:
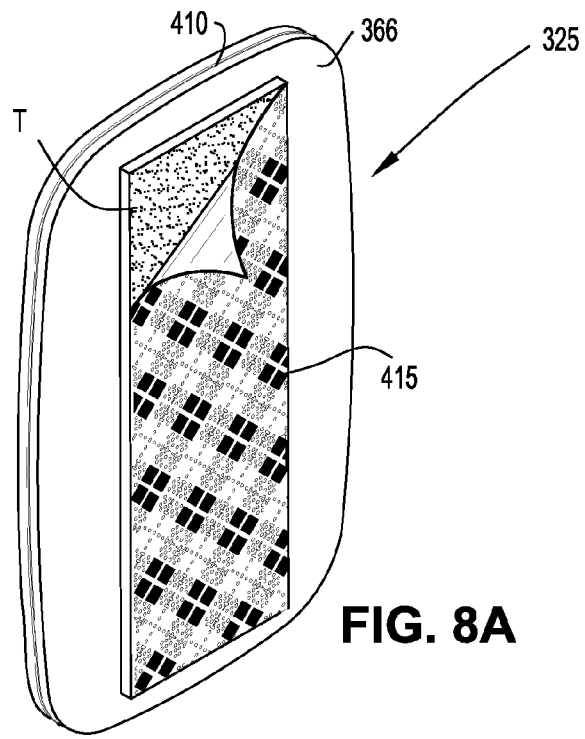
FIG. 8A shows the adhesive strip attached to the rear plate of an exemplary illustrative non-limiting leak detector L.
Figure 8B:
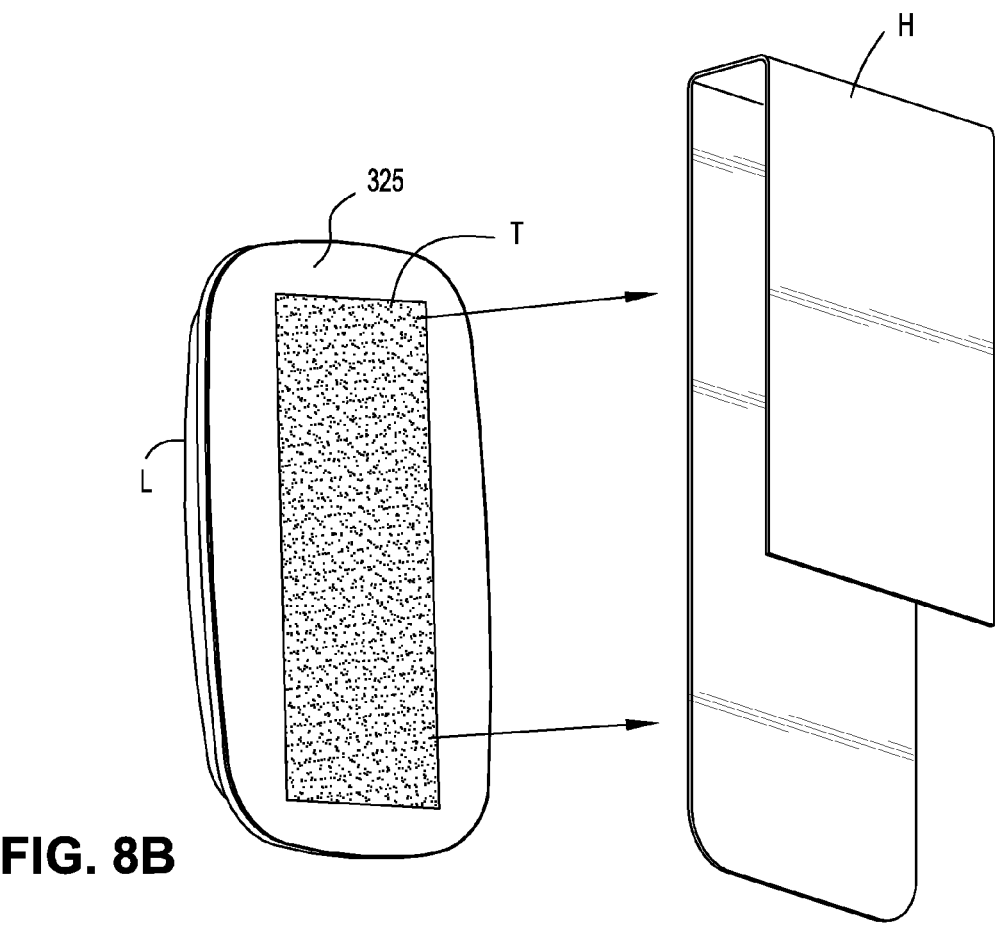
FIG. 8B shows an exploded view of the exemplary illustrative non-limiting leak detector L attached to a hanger H.

FIG. 4 shows an exemplary illustrative non-limiting installation procedure for installing leak detector L on a toilet 50. To install the leak detector L (FIG. 4 block 100), the user peels a protective backing off of double-backed adhesive tape (block 102; see FIGS. 5 and 8A) and presses the unit anywhere on the toilet tank (block 104). The user then pulls out and/or removes a battery pull tab (block 106) and waits for the leak detector L to provide an indication (block 108). Once an aural and visual indication is provided, the user flushes the toilet (block 110). The leak detector L self-calibrates by recording characteristics of the toilet flush and subsequent refill operation (block 112). When self-calibration is completed, the leak detector L is now in the detection mode and is ready to detect leaks.

A leaking flapper will produce a drop in the water level inside the toilet tank, causing the fill valve float (or pressure sensor) to activate and refill the tank, which usually lasts several seconds. This phenomenon is often referred to as a "phantom flush". As the flapper continues to leak, this process repeats itself. When a fill valve action occurs ("phantom flush" or an actual flush initiated by the user), water is forced into the tank at a rate that is a function of the water pressure, toilet feed-valve, and the ports of the fill valve itself. The pressurized water produces turbulence inside the tank, which in turn produces vibration.

The exemplary implementation has been designed to identify and isolate the "vibration signature" of a fill valve action and qualify it as either a normal flush cycle or a refill action in response to a leaking flapper. In the exemplary illustrative non-limiting implementation, the "flush signature" comprises the physical and timing characteristics observed and modeled by the exemplary implementation during the entire flush cycle. This includes but is not limited to the initial actuation of the flush handle, the evacuation of the tank water into the bowl, the closing "thump" of the flapper, and the complete refilling of the tank until the float attached to the fill valve rises to a level that turns off that same fill valve, thereby interrupting the water flow into the tank.

Because the vibration signature is different from toilet to toilet, the exemplary implementation first "learns" its environment. After attaching the product to the toilet and pulling the battery activation tab, the user is instructed to flush the toilet. The exemplary implementation then mathematically models the toilet as a function of the vibration due to water turbulence, committing the "flush signature" to memory. The exemplary illustrative non-limiting implementation then uses the "flush signature" to help determine toilet operating characteristics such as whether or not the flapper is leaking (see description below for other modeled and data logged characteristics).

Although in one example illustrative implementation the user is instructed to flush the toilet after pulling the tab and waiting for the GREEN and RED lamps to flash, accompanied by beeping, there may be times when, for whatever reason, the user does not flush the toilet. Or, the toilet could be extremely quiet (meaning that the turbulence is minimal due to a very quiet fill valve, low water pressure, or both). In such case, the exemplary illustrative non-limiting implementation can use prestored default values for detecting toilet operation. In some exemplary illustrative non-limiting implementations, no "learn" mode is provided at all, and all operations are based on preset values. Such preset values can be generic for applicability to a wide range of toilets, or they could be customized for particular models of toilets. Or they could be wirelessly or otherwise downloadable into the device at time of manufacture and/or installation (e.g., through a USB port, WIFI or other data connection).

Thus, when the exemplary implementation is unable to properly qualify a flush, it will preset itself with specific default variables and attempt to "learn" the toilet characteristics over time. Therefore, regardless of whether or not the user understands all of the directions, if the exemplary illustrative non-limiting leak detector L is minimally placed somewhere on the toilet tank and the battery pull-tab is removed, the exemplary implementation can figure out what it needs to know in order to monitor the toilet for leaks. It should be noted that depending upon what data is or isn't modeled when the unit is first installed, and given the actual normal use of the toilet and any associated background noise, it can take some exemplary implementations some time (e.g., up to 48 hours) to "learn" the toilet and respond accordingly to leaks. However, in many instances the exemplary implementation will mathematically model the toilet and detect leaks in just a few hours. Such a model can then be used to detect unintended operation of the toilet 50 indicative of a leak.

Figure 4A:
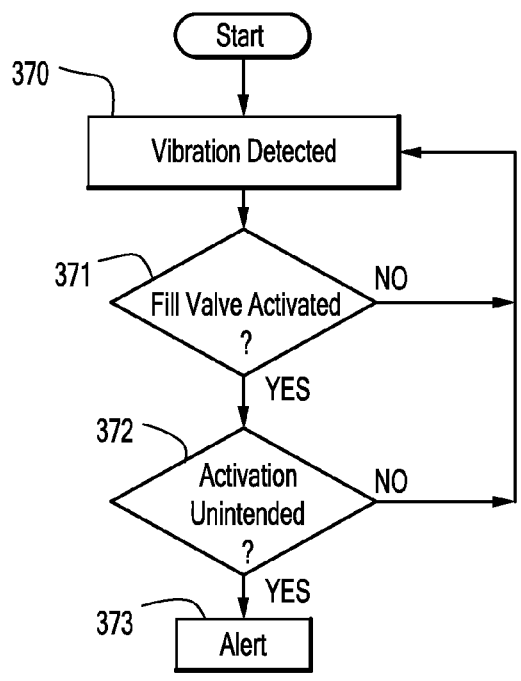
FIG. 4A is a flowchart representing an example method by which the exemplary illustrative non-limiting leak detector L recognizes a leak and generates an alert.

A simple flow chart that summarizes how leak detection can determine the difference between an intended and unintended fill valve 66 action is shown in FIG. 4A. When the leak detector L detects vibration (block 370), decision block 371 determines if said vibration is related to the action of fill valve 66 (see FIG. 9) of the toilet 50. If it is not related to fill valve 66, the process loops back to the vibration detection 370 until it once again detects vibration. If the vibration detected is due to a fill valve 66 action, then decision block 372 determines if the fill valve 66 action was intentional or unintentional. If intentional, it is understood that toilet 50 has been purposefully flushed. If unintentional, alert 373 is activated, making it known to a user or other person that a leak of some kind is taking or has taken place.

The exemplary implementation may sometimes give an indication after a flush. Periodically, the exemplary implementation will use the detected flush cycle to alert the user of its status, or to signal a detected leak. The "flush cycle" can be considered the total amount of time that the fill valve remains open to fill the tank, not just the noticeable "whoosh" of water that is used to initially evacuate the bowl when the flapper is held wide open.

Depending upon what has been determined by the exemplary implementation, the various visual and audible alerts can be as follows in one example illustrative implementation:

1. A GREEN lamp flashes approximately every 2 minutes: the exemplary implementation is functioning properly and the battery is "good".

2. A RED lamp double-flashes periodically (e.g., every 20 seconds): a toilet leak has been detected within the past 24 hours.

3. The RED lamp flashes periodically (e.g., every 20 seconds) AND the exemplary implementation "beeps" approximately 8 to 10 times each day: A toilet leak has been detected AND has gone uncorrected for a certain time such as at least 3 days (the "beep" is to attract attention to the uncorrected leak).

4. A YELLOW lamp flashes periodically (e.g., once a minute) and a beep is periodically heard: the battery is low. Users are directed to get the battery replaced, the latest detection software upgrades loaded, the unit tested, and a new enclosure installed e.g., by the factory.

Other implementations are possible. For example, some exemplary illustrative implementations may eliminate the visual display altogether and just provide audible indications. Other exemplary implementations do not provide any audible indications and instead just provide visual indications. In either case, visual indications can be as simple as a single on/off light or more complicated such as an alphanumeric display, projection of information onto another surface, or any type of visually perceivable display. Still other implementations may provide tactile feedback such as by continuously or intermittently vibrating the toilet upon detecting that the user has begun using the toilet. Any type of local or remote sensible indication can be provided.

Leak detection may thus use a detecting means and/or algorithm to determine (a) if vibration has been or is occurring; (b) if the vibration detected is due to a fill valve 66 action; and (c) if that action is either intended or unintended, the latter indicating a leak of some kind. In order to perform that function, the leak detector L may take into account a plurality of factors in order to correctly ascertain the source of any detected vibration and the correct analysis of the same. In one exemplary illustrative non-limiting example, periodical cyclical operations of the fill valve 66 are indirectly detected through sensing of noise and/or vibration caused by water turbulence, and such detection is used to trigger alert 373.

Not surprisingly, the amount and characteristics of turbulence and vibration produced by fill valve 66 actions can be different from toilet 50 to toilet. There are over 100 models of tank and flapper-based toilets currently being sold by companies such as Kohler, American Standard, Pegasus, and others, to name just a few. There are also more than a dozen different types of fill valves 66 being sold currently in just the United States alone by companies such as Fluidmaster, Korky, MJSI, and others. Further impacting the source and cause of turbulence and vibration from within the toilet 50 are such things as water pressure, tank size, and the cavity resonance of the tank, which can change in both frequency and amplitude as it fills with water.

An example non-limiting implementation of leak detector L that is designed to detect and analyze the specific turbulence and resulting noise that a particular toilet 50 produces when water is flowing and can also distinguish the same from external sources of noise. Some examples of external noise would be a bathroom fan, water running in a nearby sink or bath, loud music, heavy footfalls in near proximity, the translational vibration from a nearby highway or railroad, and/or audible gastro-intestinal noises and explosions that are sometimes emitted into the toilet bowl. The same technology the exemplary illustrative non-limiting leak detector L uses to detect turbulence can also detect the presence of someone nearby due to the vibration or noise that individual is producing. For example, operating a hair dryer, a nearby noisy shower, singing, and loud conversations, can be detected by the exemplary implementation. The exemplary illustrative device assumes that someone is in the bathroom, and it will give an indication of the toilet's status after the noise has ceased.

Some toilets are very quiet. The exemplary implementation may occasionally give a status indication before a flush cycle has been completed. This can happen on very quiet toilets, where the device senses that the turbulence has fallen below a given threshold, and therefore determines that it is time to notify the user. The exemplary implementations can automatically adjust sensitivity over a wide range in order to detect very quiet fill valve actions. This can occur as a function of a number of different factors. If the toilet is flushed during a time when it has not adjusted its sensitivity low enough, the device may not "see" the flush, and thus may not respond with any type of indication. Other implementations can detect all such flushes.

The exemplary implementation can provide a status indication after every flush. There can be a couple of exceptions in certain implementations. The exemplary implementations can for example divide the day into specific periods of time. At the conclusion of each period, the device can take several minutes to automatically recalibrate itself. During this recalibration, the exemplary implementations may be unable to detect flushes and may not respond with any type of indication. Also, in normal operation, the exemplary implementation can operate for a long time on its internal battery. However, a leaking toilet that is not fixed will cause the unit to constantly beep and flash multiple times at the end of each flush cycle, decreasing the life of the battery.

In one exemplary illustrative non-limiting implementation, a single "phantom flush" or continuously running of the fill valve does not qualify as a leak. The exemplary implementation is looking for both continuous and intermittent leaks: rather than produce a "cry wolf" indication that overreacts to various external noise, the device first looks to discount background noise such as fans, vibration due to HVAC systems, hair dryers, stereos, etc. Complex mathematical modeling algorithms can take into account a high number of variables. Other implementations provide an alert for all detected irregularities in toilet operation including continuous running and flushes.

In order to conserve battery power, the exemplary implementation periodically goes into a "sleep mode." One exemplary implementation is active in searching for leaks several times each day for several hours, during randomly occurring intervals. Statistically, most bathrooms will have "quiet" periods when they are not in use (for instance, at night). Those "quiet" times are optimum for exemplary implementations to evaluate the toilet for leaks. When a leak is identified, an internal software flag is set and the user is alerted. Other implementations continuously check for leaks.

Once a leak has been fixed, the exemplary implementation will automatically reset itself. This can take a certain amount of time (e.g., up to 48 hours) to accomplish, as several monitoring cycles in which no leaks are detected may first occur before the exemplary implementation will provide an indication that toilet operation is normal. Although it can be argued that a single phantom flush is certainly the result of a leak (water loss from the toilet tank), one exemplary non-limiting implementation is designed to identify fill valve actions over intervals of time. An extremely slow leak may not cause enough fill valve actions within a given time frame in order for the exemplary implementation to qualify a leak. Leaks that constitute less than several gallons per day may not be detected by some exemplary non-limiting implementations because of the unusually long time span between fill valve actions. It should be noted, however, that minor changes in the algorithms could easily allow the exemplary implementation to detect very slow and/or continuous leaks, if considered desirable.

There are some anomalies that may prevent the exemplary implementation from detecting a leak. A properly working fill valve 66 has a "snap action" on and off operation, meaning the valve is either on or off. However, some faulty fill valves may turn on just enough to bleed water into the tank at the same rate the flapper is leaking, producing little to no detectable turbulence. Some exemplary non-limiting implementations may fail to indicate the occurrence of a leak should the fill valve be faulty. If the volume of a leak is so minimal over time that it causes only a fill valve action every long time period such as 45 minutes or more, some exemplary non-limiting implementations may fail to see enough occurrences to qualify a leak worth alerting the user. Two things should be noted here: (1) the water loss/waste is minimal in these instances, and (2), a slow leak invariably becomes a faster leak as the flapper continues to deteriorate or deform, which the same exemplary implementations will detect. Of course, the design of the detection algorithm can be tuned consistent with battery power conservation to provide different sensitivities and detection thresholds.

It is possible and very simple to test the exemplary implementation. For example, one could construct a "leak simulator" by taking a length of fishing line or string and attaching a small weight to one end of the line (a fishing weight, like split-shot, works just fine). With the tank lid removed, press and hold the flush handle 56. While the water is draining from the tank 57, drop the weight through the opening below the flapper. Release the flush handle and allow the flapper to seat. Tape the other end of the line to the outside of the tank, allowing enough slack so that the line does not force the flapper to unseat. The fishing line or string will permit a small amount of water to flow. Leave your homemade "leak simulator" in place overnight. Assuming that an actual leak is now occurring, the exemplary implementation will indicate that a leak has been detected. After removing the "leak simulator", the exemplary implementation will automatically reset itself, ensuring that the leak has absolutely been corrected. Some flappers will leak intermittently, thus the delay to make sure that the user, if possible, has been alerted prior to the unit resetting automatically.

As long as the exemplary implementation is attached somewhere on the toilet tank and the battery activation tab is removed, it will "learn" what it needs to about the toilet and respond accordingly to leaks. Depending upon normal toilet use and nearby environmental disturbances, the exemplary implementation can take up to several days to identify a leak, although most leaks will be identified within several hours. The exemplary implementation will automatically adjust itself and cycle continuously as it seeks to correctly identify leaks and alert the user accordingly. Once a leak has been detected and the user fixes the problem, the exemplary implementation will automatically reset itself. When leaks are detected, the annunciation can be scaled to respond according to the amount of water being wasted over time (ex: slow leak=a few slow beeps; fast leak=many fast beeps). Data logging of total water flow through the toilet, including total number of flushes and estimated water leakage, can be harvested by examining or transmitting the contents of the leak detector L's internal non-volatile memory. In some exemplary implementations, an internal tank monitor with telemetry can be capable of communicating with utility meters or notifying property facilities management for multiple tenant dwellings and commercial business operations.

Example Non-Limiting Mechanical Structure

FIGS. 5, 6A, 6B, and 7 show the exemplary non-limiting leak detector L as being a mechanically compressed, or solid-coupled device, that has been designed to transfer the vibrational and/or acoustic response of the toilet fill valve 66 action at a significant enough amplitude or volume level so as to be easily detected inside, outside, on, or near the toilet tank 52. The exemplary illustrative non-limiting leak detector L in use is vibrationally coupled to a toilet tank 52 of the type having a fill valve 66 therein that automatically refills the toilet tank. The exemplary illustrative non-limiting implementation comprises an enclosure 100 that in use conducts translational vibrations produced by toilet fill valve 66 refilling. The enclosure 100 is dimensioned and configured to define therein a resonant cavity 102 which in use supports sympathetic resonant vibrations excited by the conducted translational vibrations. A transducer 300 disposed within the enclosure and vibrationally coupled to the resonant cavity 102 produces a signal responsive to the conducted translational vibrations and the sympathetic resonant vibrations. While some electro-mechanical details of enclosure 100 and its contents are describe below in connection with FIGS. 5, 6A, 6B and 7, see also commonly-assigned copending U.S. patent application Ser. No. 12/748,853 entitled "A Self-Stick Resonant Enclosure That Responds to Flush Toilet Fill Valve Water Inflow Vibration" filed on date even herewith, incorporated herein by reference for additional details concerning the mechanical structure and electromechanical operation of enclosure 100 and the components therein.

Figure 5:
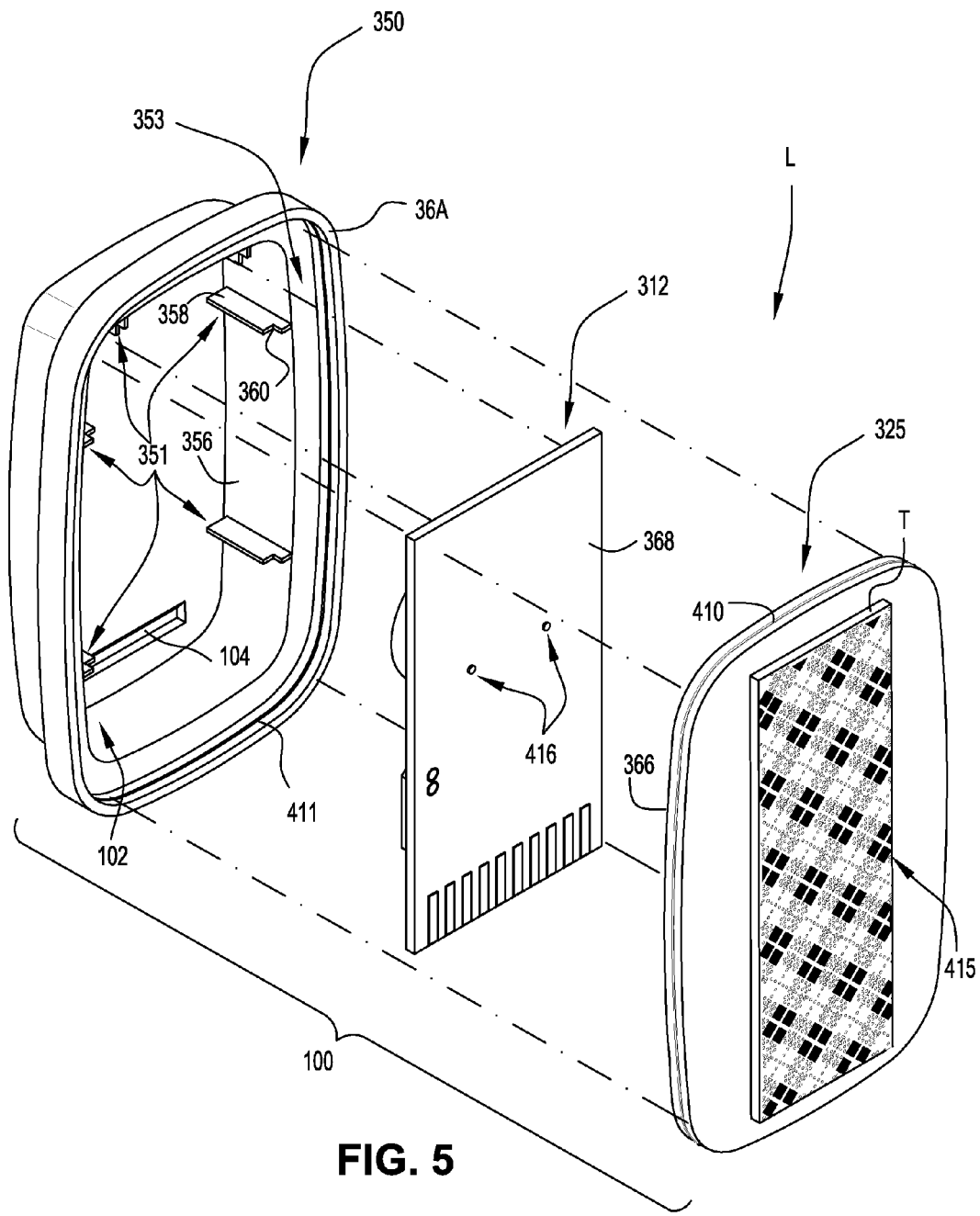
FIG. 5 shows a disassembled rear exploded view of one possible non-limiting mechanical deployment of the exemplary illustrative non-limiting leak detector L.

FIG. 5 shows a disassembled exploded view of one possible mechanical deployment of the exemplary illustrative non-limiting leak detector L. The leak detector L includes a housing 100 including an enclosure top 350 and an enclosure base plate 325. The enclosure top 350 and enclosure base plate 325 can each be made of molded plastic or any other type of suitable material. A printed circuit board 312 is press-fit into enclosure top 350, resting on fingers 351 defined within a cavity 102 formed within the enclosure top. Fingers 351 force the proper alignment, or mechanical registration, of printed circuit board 312 with the remainder of the enclosure top 350.

Figure 7:
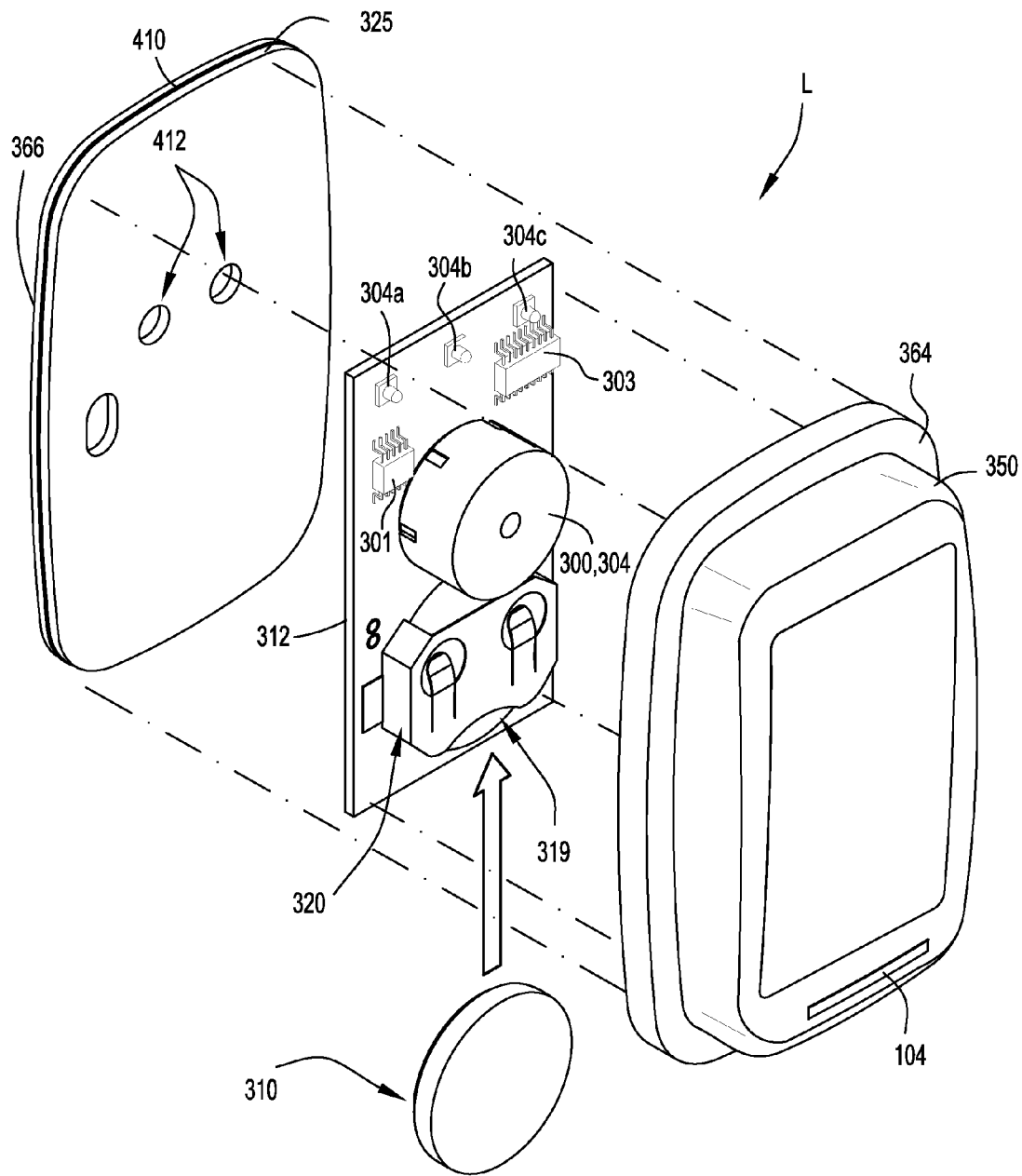
FIG. 7 shows a dissembled front exploded view of one possible non-limiting mechanical deployment of the exemplary illustrative non-limiting leak detector L detailing a printed circuit board providing the mechanical and electrical relationship of the battery, battery holder, and piezo sensor and annunciator.

FIG. 7 shows the same structure with the component side of printed circuit board 312 facing towards enclosure top 350, allowing LED's 304a, 304b, and 304c, and piezo sensor/annunciator 300 to face outward when mounted or placed on, in, or nearby, the toilet 50. Enclosure base 325 then snaps into enclosure top 350, compressing printed circuit board 312 between the base and top in a very snug fit. A battery pull tab slot 104 (see FIG. 5) can be provided in enclosure top 350 to allow a battery pull tab (not shown) to protrude from the device L during shipment and before installation. Pulling the tab through slot 104 can allow the internal battery 310 to make contact with the remaining circuitry, thereby powering the device L. In other implementations, the two enclosure portions 350, 325 are sealed at the factory to provide a waterproof hermetic seal.

Figure 6A:
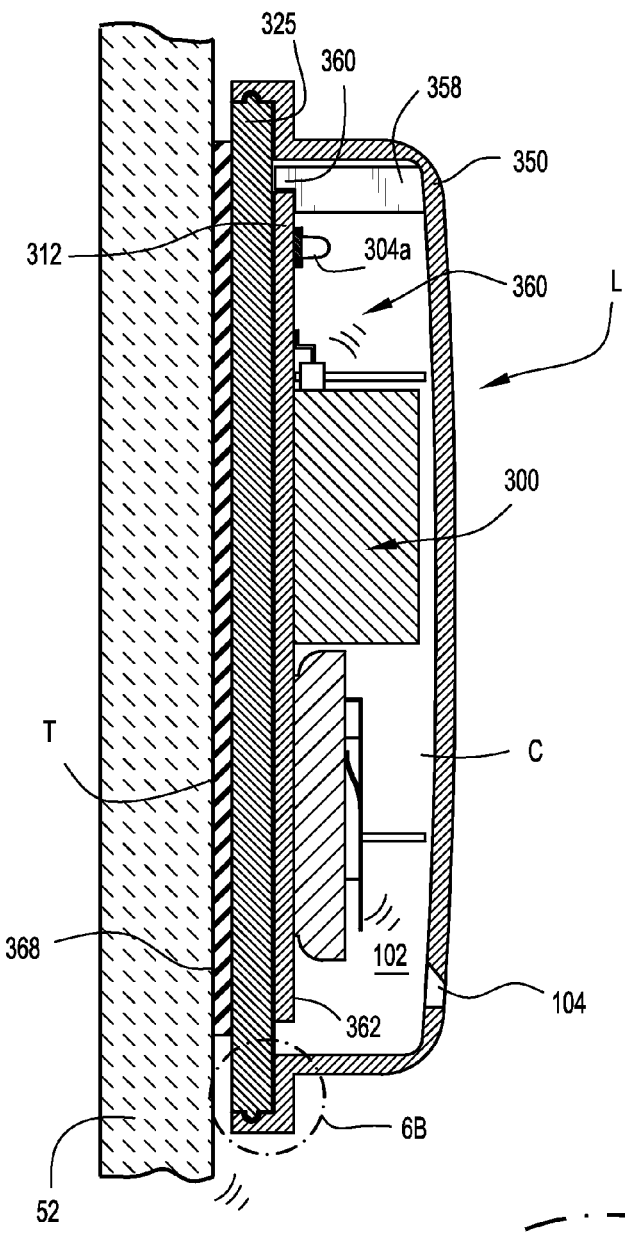
FIG. 6A shows a cutaway side view of an exemplary illustrative non-limiting leak detector L detailing the mechanical configuration of a vibration-sensitive assembly that includes a printed circuit board, battery, piezo sensor and annunciator, and protective containment housing.
Figure 6B:
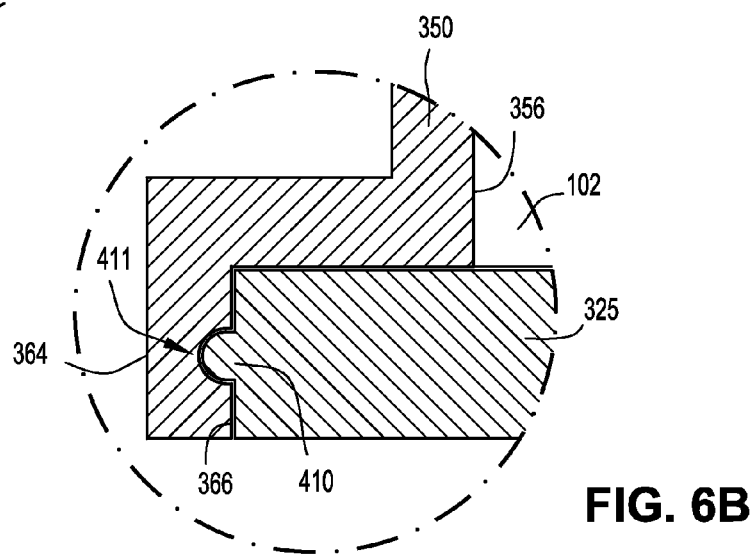
FIG. 6B shows a close-up view of the FIG. 6A exemplary illustrative non-limiting enclosure base as it mates to the enclosure top, detailing the mating rib on the enclosure base that snaps into the receiving cavity on the enclosure top.

FIG. 6B shows a protruding semi-round ridge 410 around the edge of enclosure base 325, which snaps into a semi-round cavity 411 in enclosure top 350. Enclosure base 325 has holes 412 that allow the solder joints 416 of piezo 300 to protrude beneath the inside surface of enclosure base 325, preventing obstruction so that non-component side of printed circuit board 312 is flush to enclosure base 325.

The unit is very lightweight so it can be adhered to a porcelain toilet surface with common adhesive such as double-backed tape. FIG. 5 shows a strip of double-backed tape 415 with one side adhered to enclosure base 325, and the other side ready to have its protective backing removed so that it can be attached on toilet 50 or possibly on a nearby wall. It should be noted that double-backed tape 415 may not be needed in some instances, with leak detector L simply placed on top of or near toilet 50, without being adhered to it.

FIG. 6A shows a cross-section of the fully assembled exemplary non-limiting leak detector L, whereby the resulting physical response of printed circuit board 312 attached piezo 300 is highly sensitive to the vibration and sound produced by fill valve 66 action. Although one purpose of exemplary non-limiting leak detector L is to identify intended and unintended fill valve 66 actions, it will also detect other nearby sounds and vibrations related and unrelated to fill valve 66 actions. Distinguishing between non-fill valve 66 actions is described below.

Cyclical Operation of a Flush Toilet

One example non-limiting implementation of leak detector L detects cyclical operation of a flush toilet 50. In the exemplary illustrative non-limiting implementation, the leak detector L detects cyclical fill valve operation of a conventional toilet to detect leakage. Before examining how an actual cyclical fill valve 66 action is specifically determined and distinguished from internal and external vibration and noise, a discussion of basic toilet intended and unintended operation may be helpful.

Figure 12:
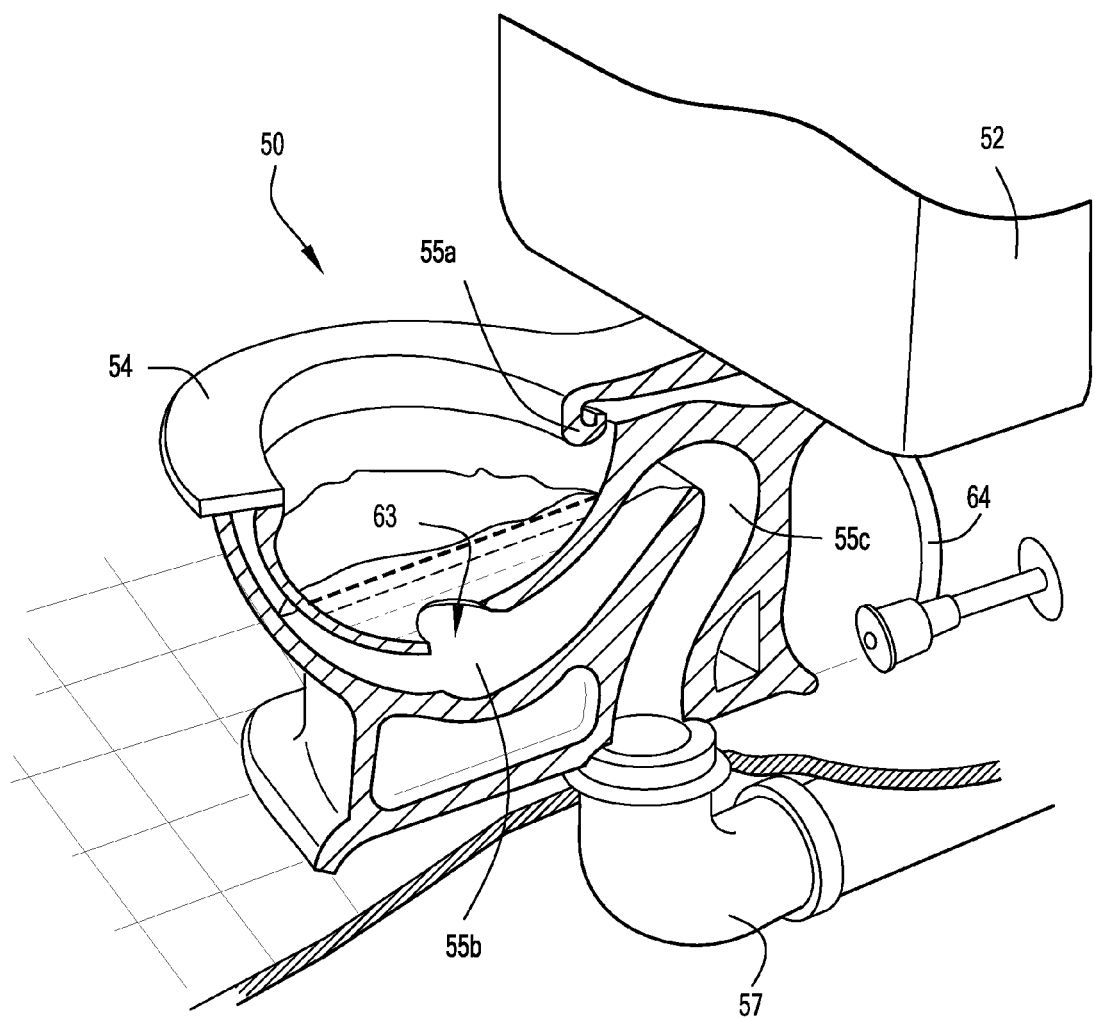
FIG. 12 shows the conventional toilet as the bowl is being evacuated by water flowing from the tank into the bowl.

FIGS. 9-15B show an example modern conventional toilet 50 comprising a tank 52 and a bowl 54. The tank 52 holds a quantity of water W. Pulling on flush handle 56 causes lever 58 to lift chain 60, which in turn raises flapper 62 at the bottom of tank 52. Flapper 62 is a kind of valve that flaps open (up) and closed (down). When chain 60 raises flapper 62 off of the flush valve seat 65 (see FIGS. 10 and 11), water W from the tank 52 rushes downward through an opening into the bowl 54. This inrush of water flows through rim holes 55a and siphon hole 55b (see FIG. 12). This water inrush increases the water pressure within the bowl, forcing water through exhaust port 63 and past vapor trap 55c beneath the bowl and down into waste pipe 57. This flow of water and waste into the waste pipe 57 creates a strong siphon that evacuates the bowl through exhaust port 63, producing the characteristic flushing "whoosh" sound familiar to most people. In most toilets, the bowl 54 is molded so that the water enters the rim, and some of it drains out through rim holes 55a. In many modern toilets, a good portion of the water flows down to a larger siphon hole 55b at the bottom of the bowl as shown in FIG. 12. This hole is known as the siphon jet. It releases most of the water directly into the siphon tube. Because all of the water in the bowl enters the tank in a very short time (e.g., three to five seconds), it is enough to fill and produce the siphon effect, and all of the water and waste in the bowl is sucked out into waste pipe 57.

Figure 13:
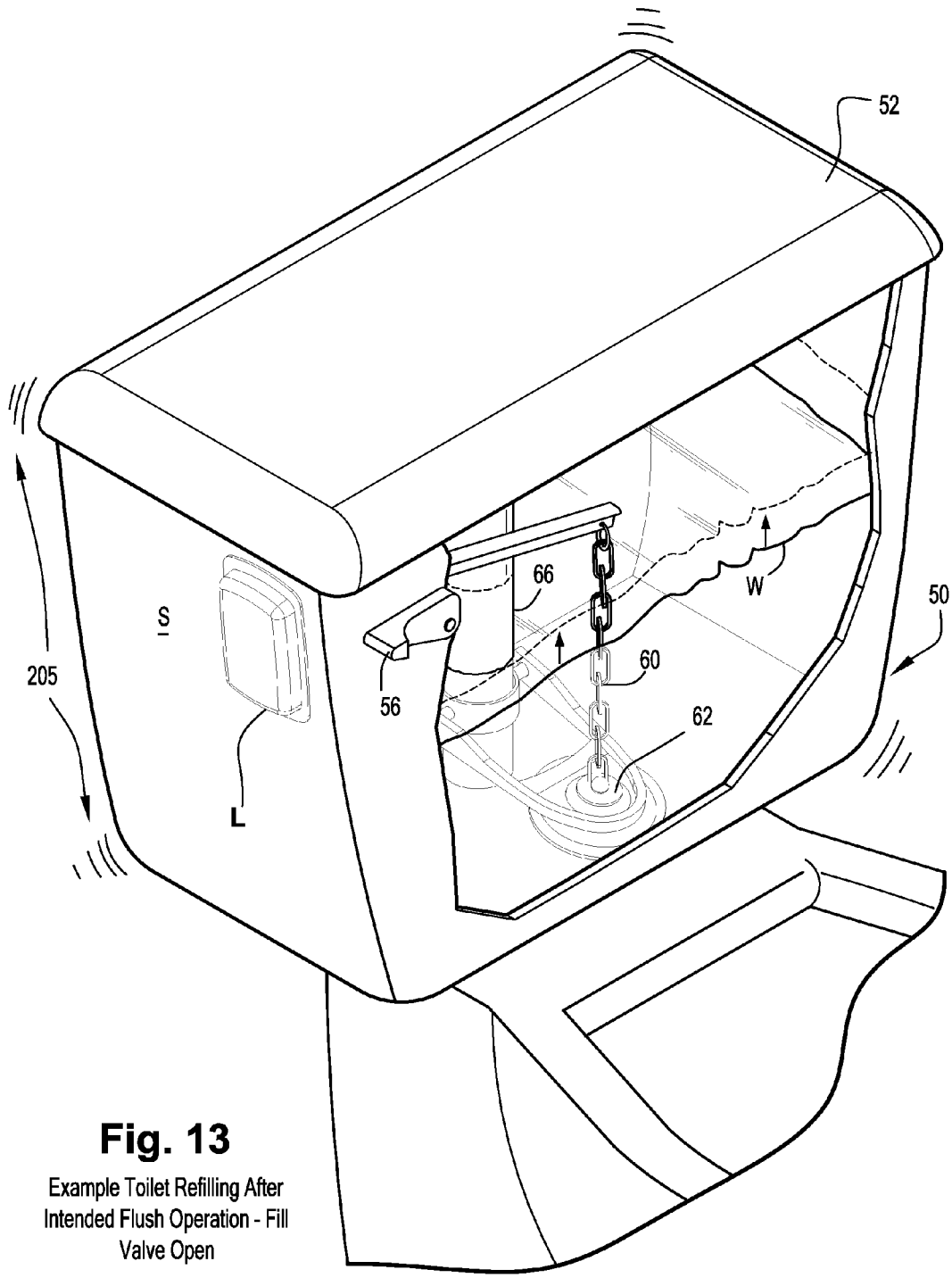
FIG. 13 is a cutaway front-facing view of an example toilet after an intended flush operation, with the tank refilling through the fill valve after the flapper has returned to its down and sealed position.

When nearly all of the water has escaped from the tank 52, the flapper 62 descends back down to its original position as shown in FIG. 10, once again sealing the water passage between the tank and the bowl 54 (see FIG. 13). Fresh tap water flowing into the tank 52 through a fill valve 66 from an inlet pipe 64 begins to fill the tank. Turbulence or water entering the tank causes the tank to vibrate and water can be heard running into the tank. A float 112 rises with the rising water level. When the float 112 reaches a preset level, the fill valve 66 closes automatically in response and water ceases to flow into the tank 52. The toilet 50 is now quiet and is ready for another flush (see FIG. 10), having now operated properly with respect to water flow. Notice that the proper operation of fill valve 66, as described above, should only occur when a flush is initiated, or purposefully intended, by the movement of flush handle 56, which causes the entire flush cycle to commence and repeat.

Figure 9:
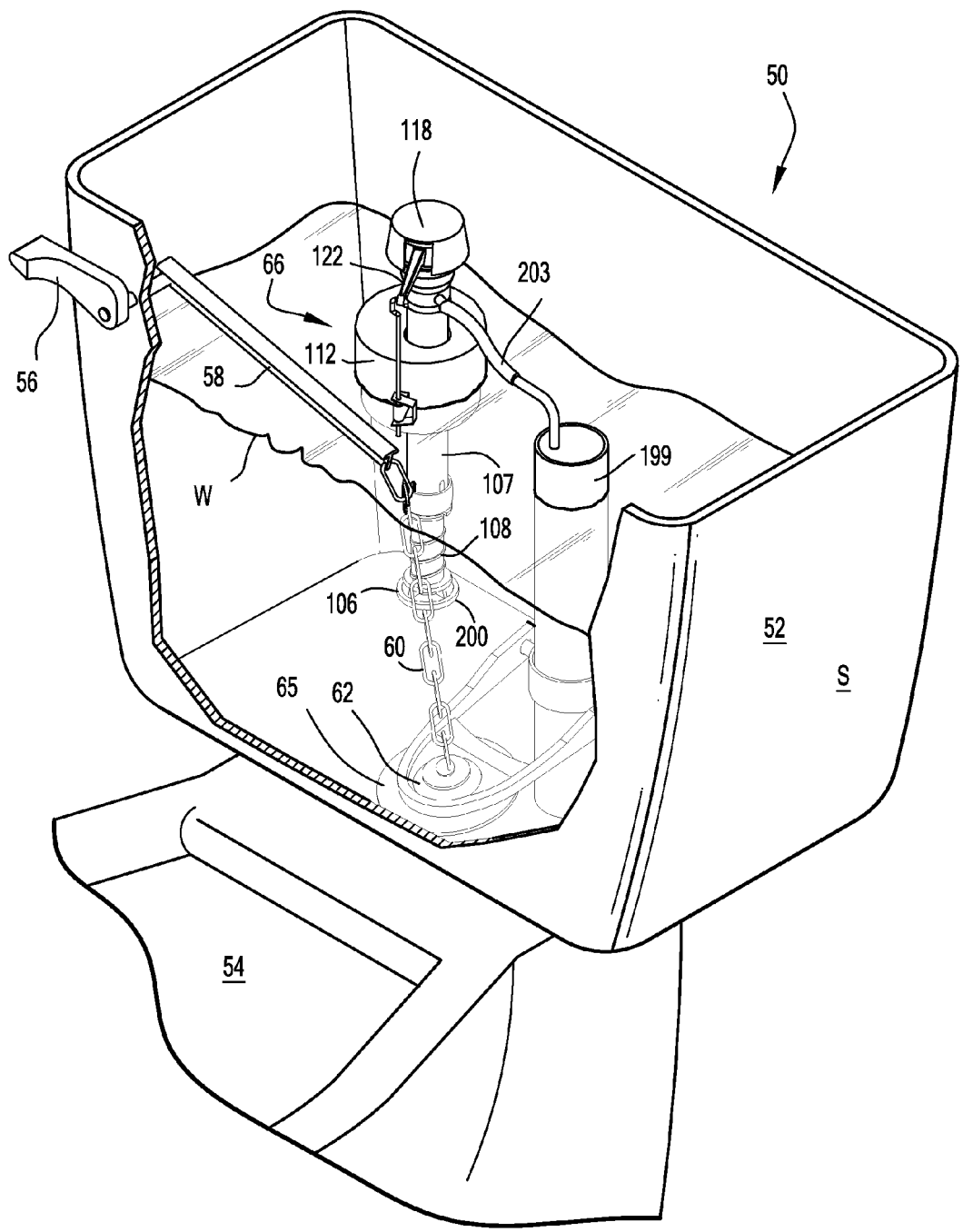
FIG. 9 is a cutaway view of an example illustrative conventional toilet prior art toilet tank.
Figure 10:
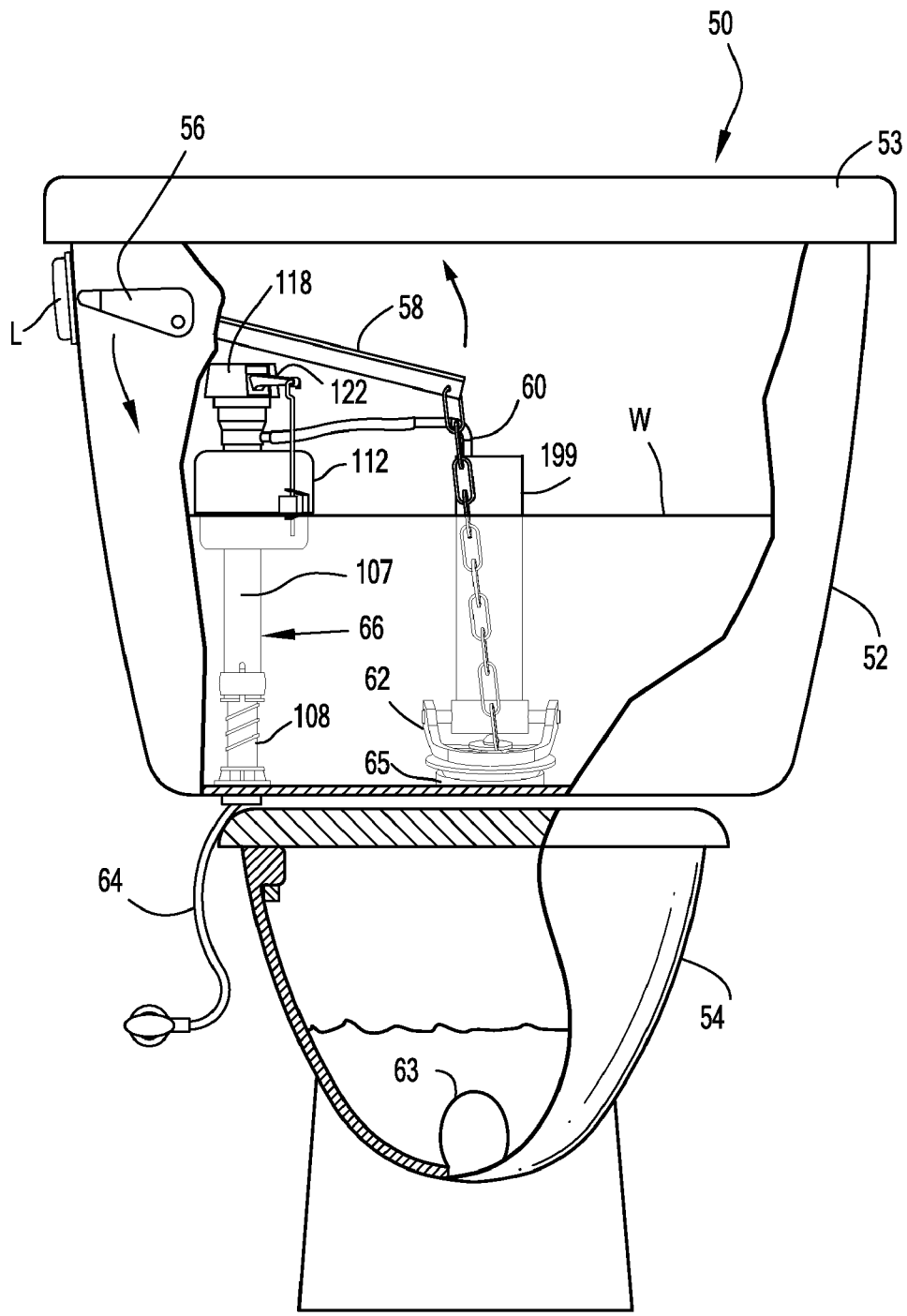
FIG. 10 is a cutaway view of an example toilet during a user-intended flush operation wherein the user presses the flush handle to initiate a flush.
Figure 11:
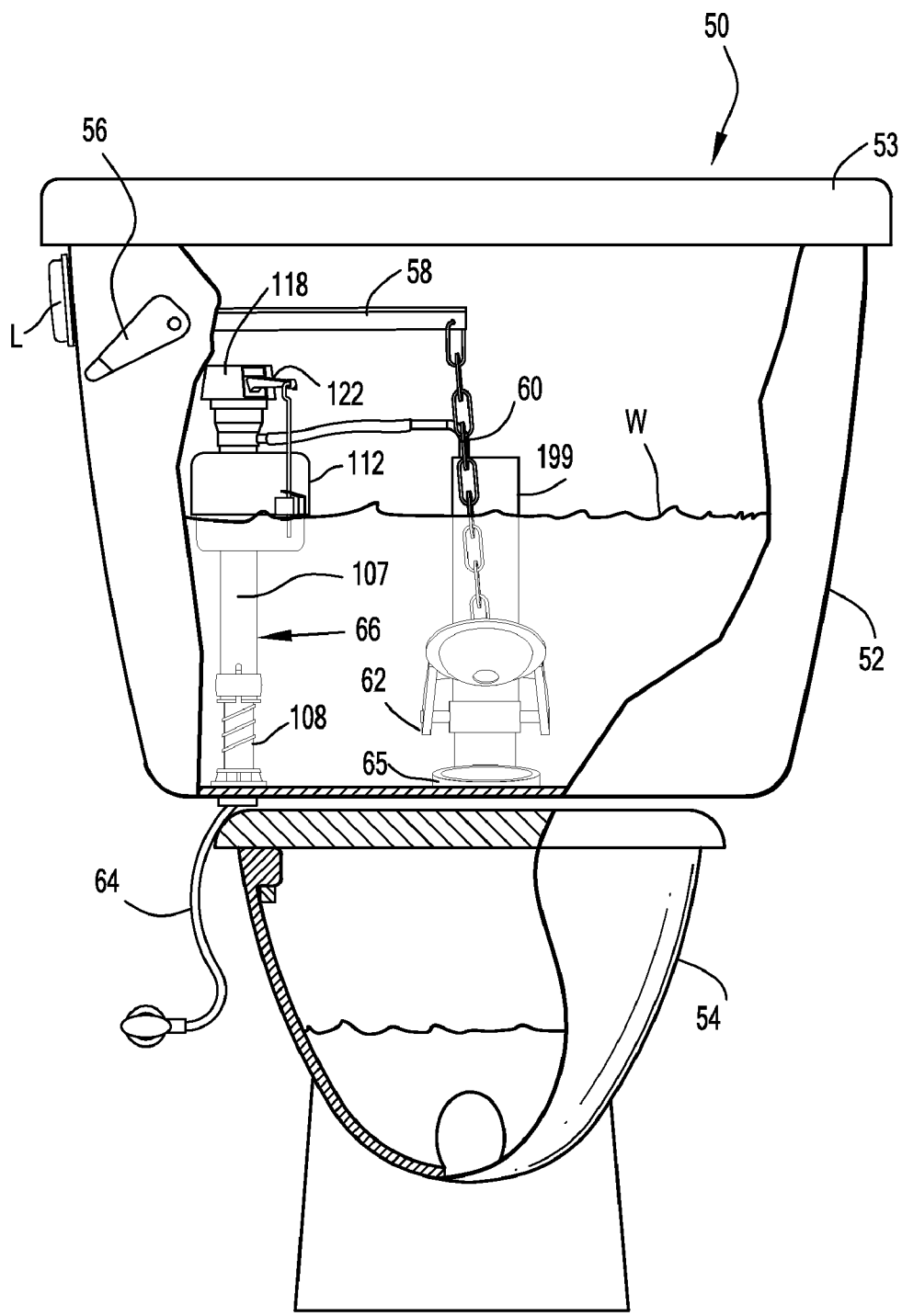
FIG. 11 shows the FIG. 10 toilet after the flapper has been opened and water is flowing from the tank into the bowl to evacuate the bowl.

Fill valve 66 operation generally operates in the following manner. As previously explained and illustrated in FIGS. 10 & 11, fill valve 66 fills tank 52 with water when float 112 falls below a predetermined level water height 81 (which is usually between ¼ and ¾ inch below water height 80) and terminates the flow of water when float 112 rises back to water height 80. A properly functioning fill valve 66 will only allow water flow when float 112 falls below the aforementioned predetermined height. When fill valve 66 opens to allow water flow, said water flows out of base port 200 located at the bottom of the fill valve 66 just above the inside bottom of tank 52 as shown in FIG. 9, and also through refill hose 203 into overflow tube 199, which evacuates into bowl 54. The water flow through the entire body of fill valve 66 and by base port 200, under pressure from inlet pipe 64, produces water turbulence 204 and causes water and tank vibration 205 (FIG. 9), and also produces water collisions against the side and bottom of tank 52, resulting in noise within and around tank 52. The simultaneous water flow through refill hose 203 into overflow tube 199 produces additional vibration and audible noise.

An intended fill valve 66 action is simply flushing toilet 50, the normal operation of which has been previously described. During the flush, the fill valve 66 opens and allows water to flow until flapper 62 has closed and float 112 has risen to the level of water height 80. The total time duration of this fill valve 66 action is the amount of time it takes to first evacuate tank 52 into bowl 54, at which point flapper 62 closes, plus the amount of time it takes to refill tank 52 with water W to water height 80. The primary factors determining this time duration are generally the volume of water in tank 52 prior to the flush being initiated, the size opening of the evacuation port beneath flapper 62 and the volume of water over time that is able to flow through it while flapper 62 is open, and the water pressure and flow rate applied through inlet pipe 64 that flows through fill valve 66, which are factors in refilling tank 52 back to water height 80 after flapper 62 has closed.

Whether intended or unintended, fill valve 66 actions that permit water flow thus generally result in some level of vibration and audible noise (or sound) that is conducted into and through tank 52. See FIG. 13. The mechanical vibration and/or sound can be detected by a variety of different kinds of well-known devices, such as microphones and piezoelectric sensors. Measurement of tank vibration 205 and/or the sound with a sensor with a wide broadband response shows a frequency distribution from below 200 hertz to well above 10 kilohertz, with frequency distribution and power bandwidths that change from toilet to toilet due to variations in water pressure, tank volume and acoustics, fill valves, overflow tubes, and virtually all of the factors that affect the turbulence and resulting noise due to the flow of water within the toilet itself. Basically, every toilet exhibits a unique vibration and/or noise signature, and no two are exactly alike. Whether flapper 62 remains open, allowing water to evacuate into bowl 54, or whether it is closed, causing water W to rise, the combined vibration and audible noise produced can be detected by the leak detector L shown in FIG. 1.

Leak Detection Based on Cyclical Analysis of Toilet Operation

Figure 14:
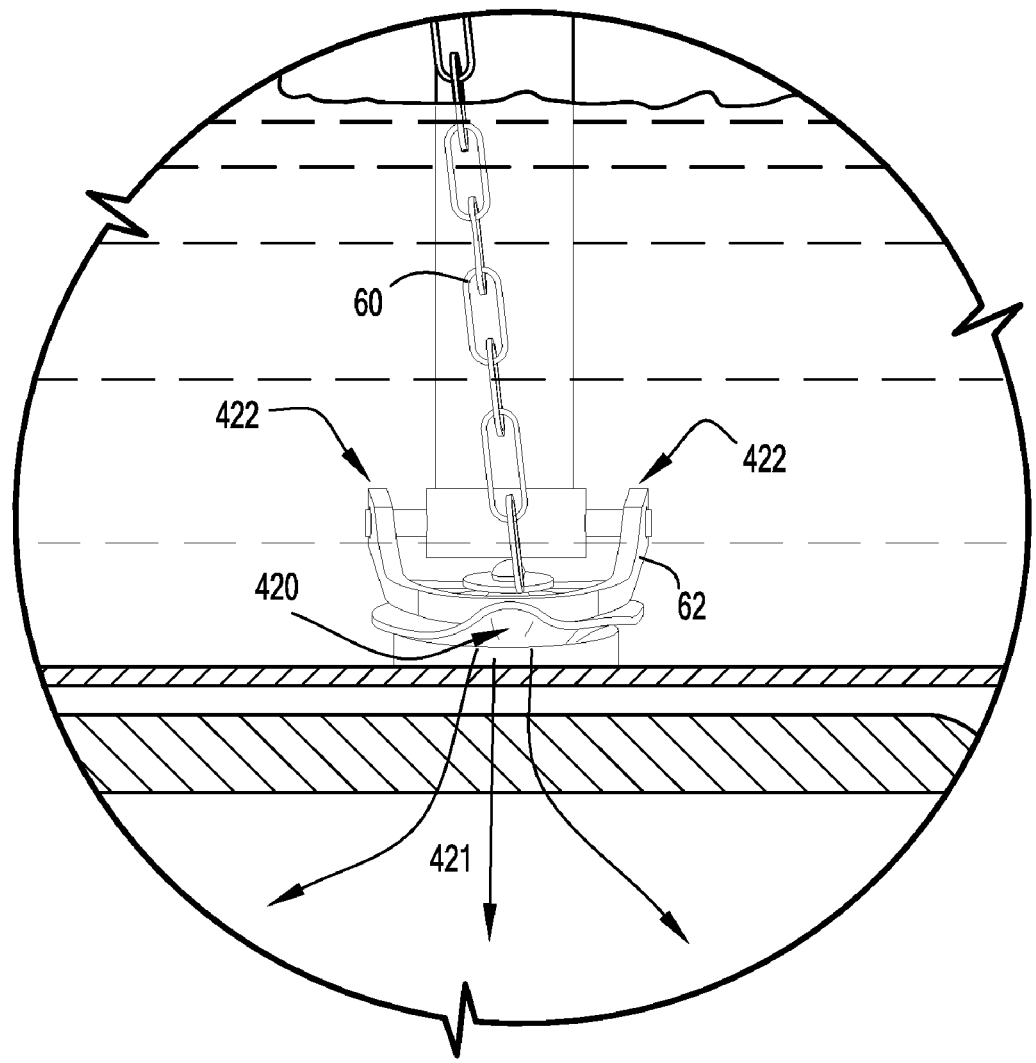
FIG. 14 is a close-up internal view of a toilet tank leaking due to a defective flapper.

An improper or unintended operation of fill valve 66 occurs when it opens to allow water flow, but no user has initiated a flush by operating flush handle 56. Referencing FIG. 15B, the most common form of this anomaly is known as a "phantom flush"—a fill valve 66 action that occurs briefly in response to float 112 falling below the predetermined level of water height 81 that is most frequently due to a leaking flapper 62 as shown in FIG. 14. Less common leaks are those that leak through corroding bolts in the bottom of tank 52 or from the rubber seal located between tank 52 and bowl 54.

Detecting the vibration 205 due to turbulence 204 and the noise produced within tank 52 by the fill valve 66 when open and analyzing those disturbances mathematically can allow system L to detect and determine whether fill valve 66 is operating and whether the operation is intended or unintended, and do so from any internal or external location on tank 52 or bowl 54, and depending upon the amplitude of the disturbances, even from a location nearby that is not directly or mechanically attached to the toilet 52.

An unintended fill valve 66 action is normally understood to be caused by some sort of leak. However, because an unintended fill valve 66 action also implies that a flush has not been purposed, flapper 62 remains seated, although in being seated it could still be the cause of the leak. FIG. 14 shows one of many types of flapper deformations, a warped seal 420 that can result in the unintended action of water evacuating 421 into toilet bowl 54.

Leaks caused by deteriorating flapper 62 often begin as intermittent, or non-continuous, leaks. Initial warping or slow deterioration due to chlorine, poor water quality, dirt, or simply the aging of flapper 62, can initially mean that flapper 62 will leak at times, or may fully seal at other times. An intermittent leak can also occur when flapper 62 does not seat properly due to wear on flapper hinge 422, excessive water turbulence 204 due to fill valve 66 being "on", an overly hard press or yank of flush handle 56, or the breaking of flush handle chain 60. Dye tablets, which turn the tank 52's water blue and will therefore seep through a leaking flapper 62 and turn bowl 54's water blue, are well known and often used by plumbers and homeowners to try and detect leaks. However, if flapper 62 is not actively leaking at the time when the dye tablets are dropped into tank 54, the water in bowl 54 will obviously not turn blue.

Figure 15A:
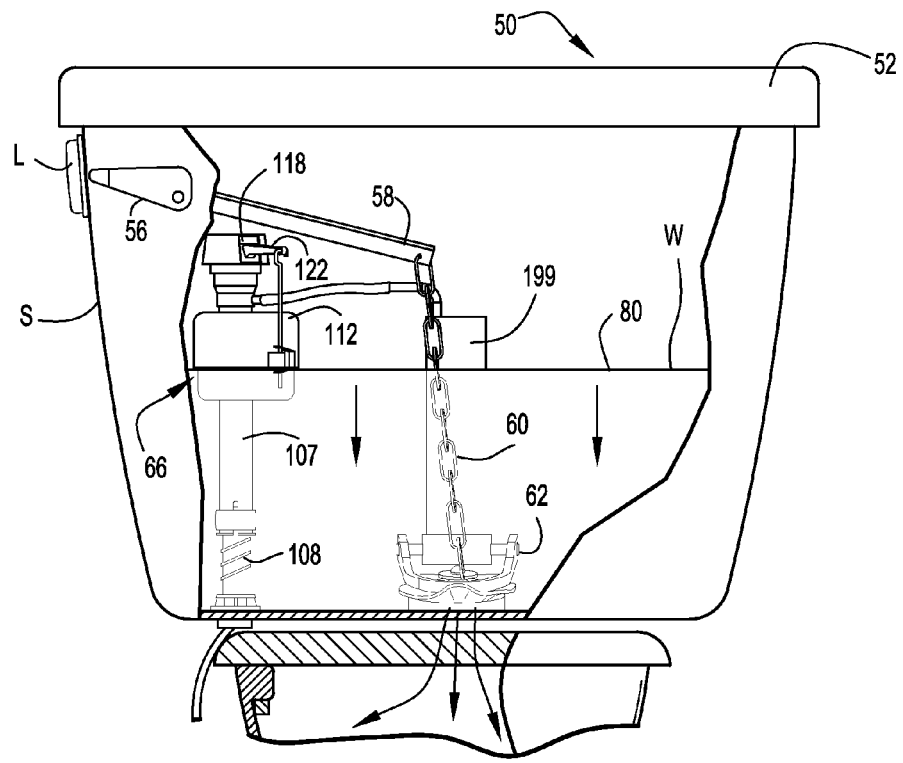
FIG. 15A is a cutaway view of an example toilet tank as water height falls due to leakage through a defective flapper.
Figure 15B:
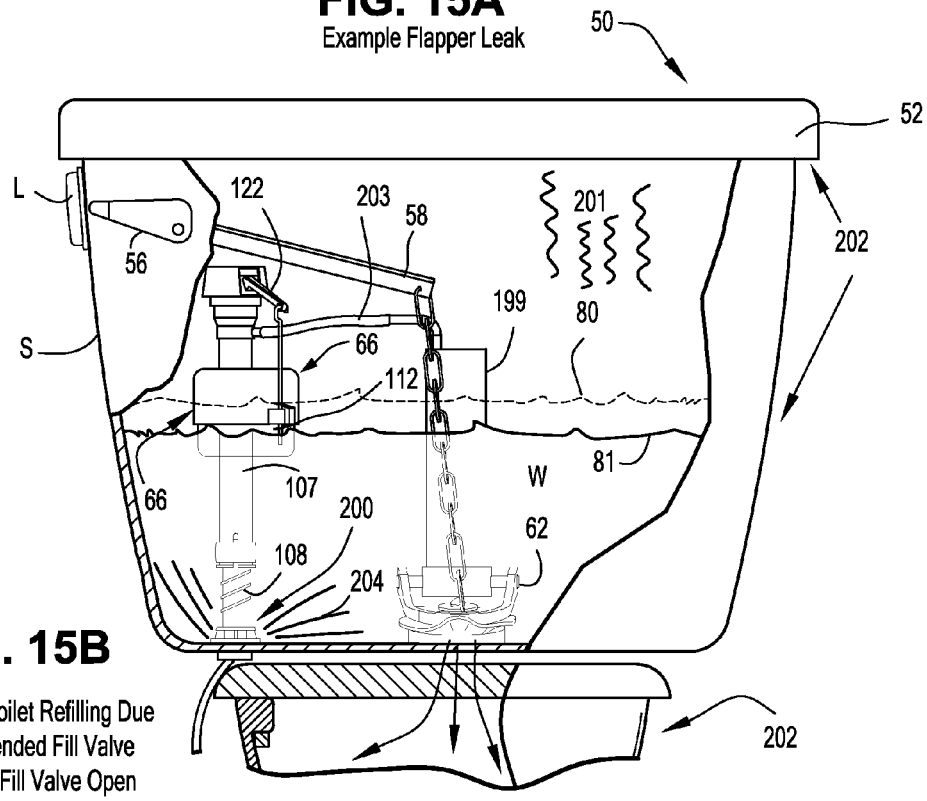
FIG. 15B is a cutaway view of an example toilet tank refilling through the fill valve after sufficient water has leaked out through the defective flapper to cause a refill to begin.

Regardless of the cause of the leak that produces the unintended fill valve 66 action, said leak will cause the level of water W in tank 52 to decrease in volume, and therefore eventually fall below water height 81. See FIG. 15A. When float 112 vertically drops to water height 81, fill valve 66 turns "on", allowing additional water W to flood tank 52 until water height 80 is reached or exceeded, whereby float 112 responds to the rise of water W, thereby turning "off" fill valve 66. See FIG. 15B. If the leak has not been fixed or repaired, this cycle as shown in FIGS. 15A and 15B will repeat indefinitely without the user ever operating flush lever 56.

Unlike the intended fill valve 66 action where the fill valve is "on" for all, or nearly all, of the complete flush cycle and represents a single time duration (later referred to as T1 in FIG. 16A), a cyclical unintended fill valve action in response to a leak generally has two separate identifiable time components, both of which tend to remain fairly consistent with respect to duration. The first time duration (later referred to as T4 in FIG. 16B) of this particular cycle is related to how long fill valve 66 is not active, or is not "on". The primary determinant for this time duration is the volume of water leaked over time, which determines how quickly the water W will drop from water height 80 to water height 81. Water height 81 is the point at which float 112 falls below fill valve 66's mechanical "off" threshold, thereby turning "on" fill valve 66, which then floods tank 52 with water. The second time duration (later referred to as T3 in FIG. 16B) is related to the fill valve 66 action that refills tank 52 from water height 81 back to water height 80 due to float 112 rising as water W rises, which has previously been generally identified as being a distance of anywhere from ¼ to ¾ inch, but can be as much as an inch or more. The ¼ to ¾ inch distance is a function of the fill valve, which tends to remain mechanically consistent, thereby causing the first and second time durations to generally remain reasonably consistent. The primary factors influencing this time duration are the water pressure and flow rate applied through inlet pipe 64 and fill valve 66 and the volume of water needed to refill tank 54 between water height 81 and water height 80.

Figure 16A:
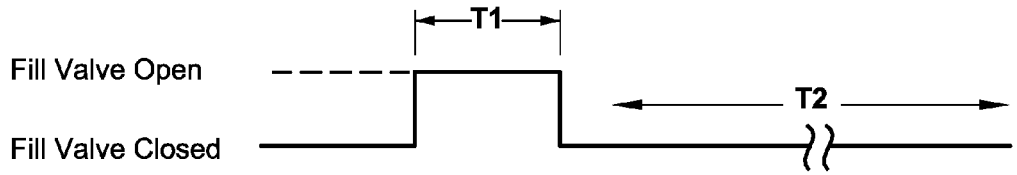
FIG. 16A is an example timing diagram representative of signals generated by the exemplary illustrative leak detector L when an intended flush occurs with no leaking flapper.

FIG. 16A shows two basic logic levels: a "valve open" logic level, the duration of which is identified as T1; and a "valve closed" closed logic level, the duration of which is identified as T2. In simplest terms, fill valve 66 is either open or closed for either T1 or T2 time periods, respectively. FIG. 16A illustrates the logic response of a single random or periodic flush, reflecting the fill valve 66 "open" duration as T1. Because T1 is shown as a single event, no consistent T2 times are implied and can be considered random or periodic in their occurrence, while T1 tends to be relatively consistent in duration, the time of which only tends to change as a function of water pressure and/or changes in the rate of flow through fill valve 66.

Figure 16B:
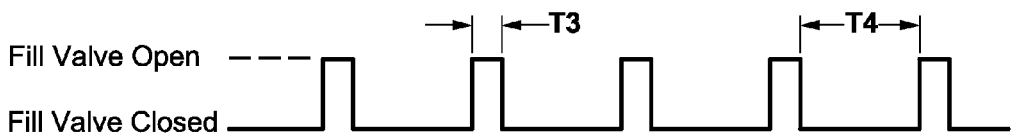
FIG. 16B is an example timing diagram representative of cyclical signals generated by the exemplary illustrative leak detector L due to cyclical refills of the tank when there is leaking flapper and no interruption by an intended flush action.

FIG. 16B is similar to 16A. The logic levels reflect fill valve 66 being either open or closed, and the timing diagram represents the time durations typically observed when no flush has occurred and flapper 62 is leaking. Time period T3 corresponds to the fill valve 66 action as water W raises from water height 81 to water height 80. Time period T4 corresponds to the amount of time it takes for the water W to drop from water height 80 to water height 81 due to a leak. The periodic repetitious or cyclical timing pattern in FIG. 16B has been empirically observed to be generally consistent in that the T3 durations tend to be consistent, as do the T4 durations. Due to the relatively low volume of water required to refill tank 52 from water height 81 to water height 80, minor changes in water pressure or flow rate don't affect the T3 durations significantly.

Figure 16C:
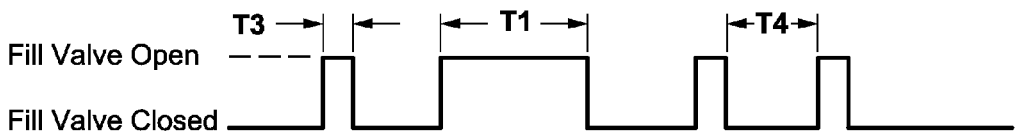
FIG. 16C is an example timing diagram representative of signals generated by the exemplary illustrative leak detector L due to cyclical refills of the tank when there is leaking flapper and an intended flush occurs.

FIG. 16C Illustrates a combination of events as represented in FIGS. 16A and 16B above. The implied repetitious (periodically repeating) cycle of T3 and T4 durations shown in FIG. 16B are interspersed with periodic or random T1 flush cycles.

Figure 16D:
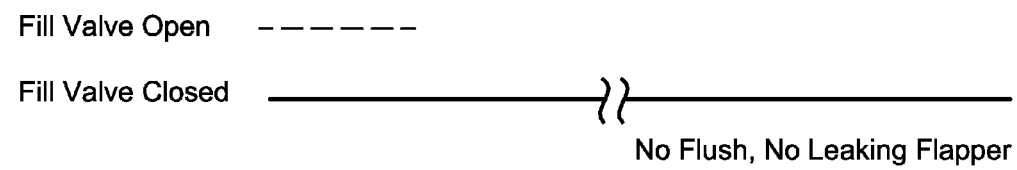
FIG. 16D is an example timing diagram representative of signals generated by the exemplary illustrative leak detector L during the absence of a random or periodic flush and the flapper is not leaking.
Figure 16E:
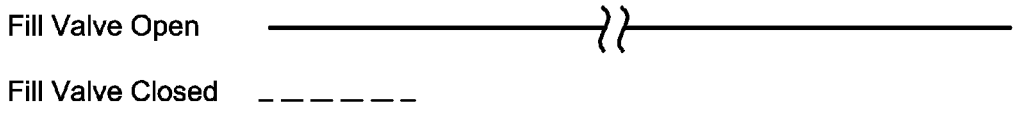
FIG. 16E is an example timing diagram representative of signals generated by the exemplary illustrative leak detector L when the flapper is stuck open.

For completeness, FIG. 16D shows a continuous logic level of fill valve 66 being closed for an indefinite period of time, so that no leak or flush of any kind is represented. FIG. 16E is the opposite representation of FIG. 16D. The fill valve 66 is stuck open for an indefinite period of time.

It would be possible to determine fill valve 66 actions as a go/no-go function if there were no extraneous vibration or noise to take into consideration. In one exemplary non-limiting mode, only the T3 time duration is used to determine and qualify a leak. However, the external and toilet-related vibration and noise variables previously mentioned suggest that detecting those logical functions is more complex. Therefore, incorporating the above logical sequences into the operational algorithms of the exemplary non-limiting disclosed leak detector L provides for the device to either be set up and programmed for specific individual toilets, taking into account relevant variable parameters, and/or allow the device to be capable of determining parameters with minimal user input, or in some cases without any human input of any kind. Because it is assumed that many end users will likely be unable to facilitate complex set-ups, the exemplary preferred embodiment can utilize preprogrammed algorithms and be capable of automatically using predetermined default variables or determining the variable parameters on its own that will allow it to mathematically define and model the nature of fill valve 66 actions, be they intended or unintended.

Expanding on that more simple deterministic analysis, a further disclosure of the non-limiting implementation herein demonstrates how to also data log other detected toilet functions, such as total number of flushes and hence the number of fill valve actions related to flushes; calculate total water flow due to flushes; calculate or estimate total water wasted due to leaks; and provide real time data on water usage. The exemplary illustrative non-limiting implementation can accomplish all of those tasks inexpensively while keeping the installation of the leak detector device L simple and then alerting the user in the event of a leak.

Example Block Circuit Diagram

Figure 17:
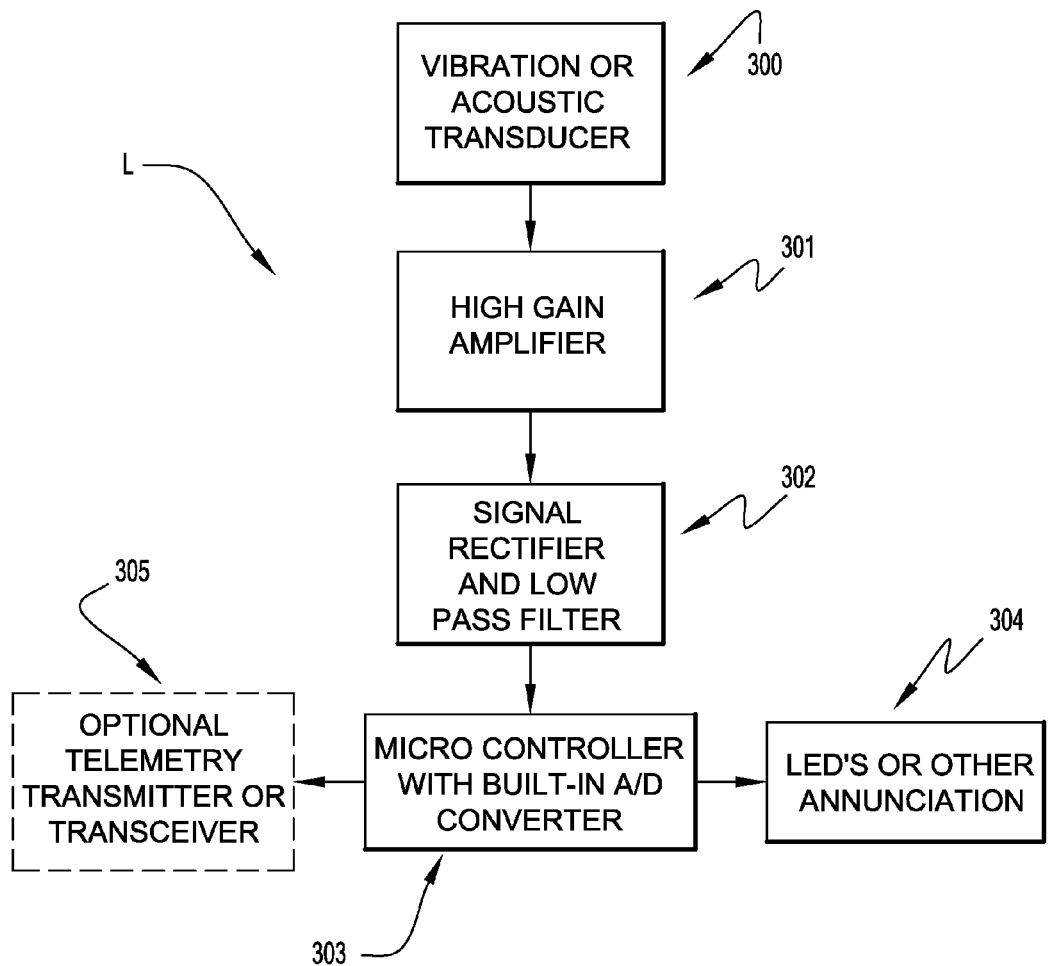
FIG. 17 is an electrical block diagram of an example illustrative non-limiting leak detector L.

FIG. 17 shows an exemplary illustrative non-limiting block diagram for the circuitry within a non-limiting implementation of a leak detector L. In one exemplary illustrative non-limiting implementation, a vibration or acoustic transducer 300 such as a piezo-electric device is used to sense vibrations and/or sounds generated by the toilet. The sensed vibrations and/or sounds are converted by transducer 300 into electrical signals that are amplified by a high gain amplifier 301 and rectified and filtered by a rectifier and low pass filter 302. A processor 303 with built-in analog-to-digital converter converts the analog signals into digital form for analysis by software running on the processor. The processor 303 outputs alerts as a result of this analysis. These alerts can be communicated to the user visually by lighting up a display such as one or an array of light emitting diodes, aurally by actuating an annunciator (which may be the same device as transducer 300, the sensing and annunciating operations being time-multiplexed), and/or transmitted wirelessly or via a wire using telemetry or other techniques to a remote location for indication and/or further analysis.

Example More Detailed Non-Limiting Detection

FIGS. 18A through 18D show an exemplary non-limiting example flowchart that details the operation of said leak detector L. FIG. 19 will be used to explain circuit operation in this example, with processor 303 executing all of the logic operations.

Figure 18A:
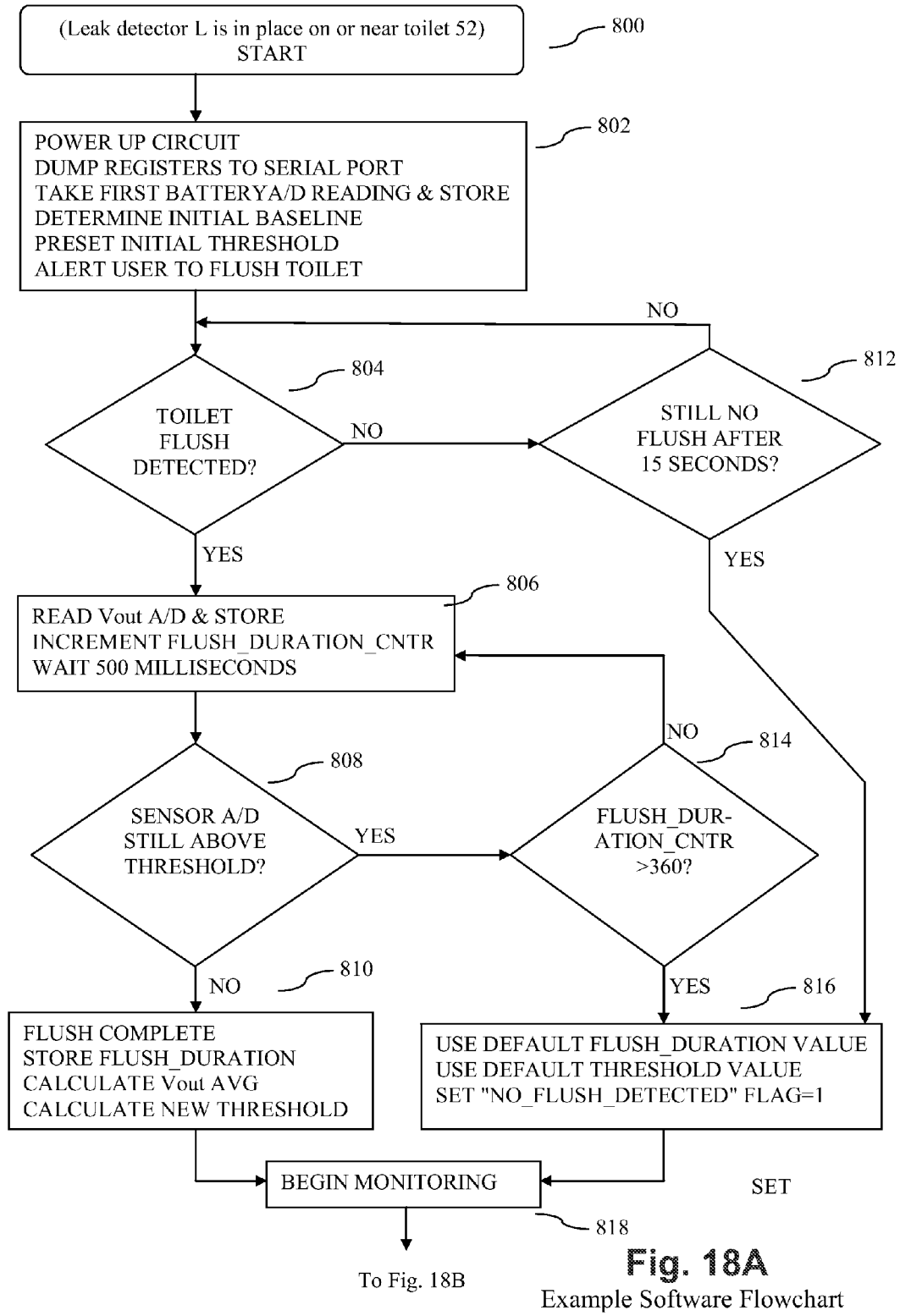
FIGS. 18A, 18B, 18C and 18D are flowcharts that represent an exemplary illustrative non-limiting operational software implementation of an example leak detector L.
Figure 19:
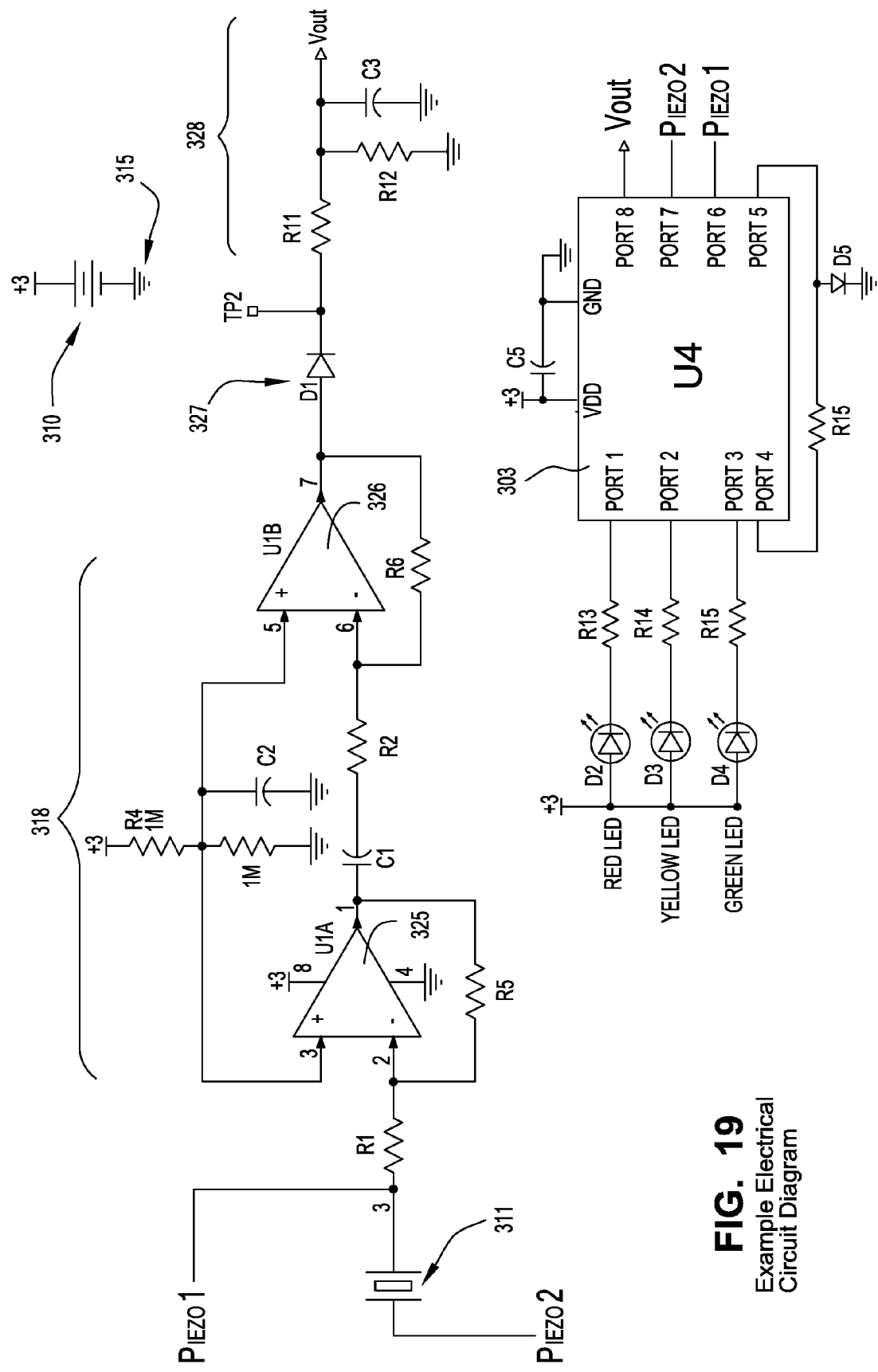
FIGS. 19 and 20 are a detailed electronic circuit schematic showing an exemplary illustrative non-limiting leak detector L.

Block 800 in FIG. 18A assumes that the leak detector has been placed on or near the toilet 50 to be monitored. Block 802 begins the operational sequence in which the user is instructed to pull the battery tab (see also FIG. 4, block 106), which allows the battery to begin providing power to the circuit. Immediately upon powering up, processor 303 first dumps all previously monitored data, if there is any, from its internal non-volatile memory via one of the ports that can be configured to transmit serial data. Port 4 on processor 303 is then taken high so that the voltage drop across standard switching diode D5 can be measured by Port 5 of processor 303, configured for A/D conversion, thus measuring and storing the initial 10-bit value that corresponds to battery 310's life, said 10-bit value later used as a future comparison to determine remaining battery life. Those skilled in the art will recognize this method as one of the simplest for determining power supply voltage, and hence for determining battery 310's power delivery capacity.

After a slight delay that allows analog sections 318 and 328 to settle, an initial quiescent baseline must be determined. This baseline is performed when fill valve 66 is not active, meaning that no water is flowing. Processor 303 takes five groups of readings of the DC voltage at Vout, with each group containing five A/D samples spaced 1 one second apart. Each group is then mathematically averaged. The five resulting group averages are also averaged and the standard deviation determined. If the standard deviation of the five groups is less than 2, the baseline is established as being the average bit count of the five groups. If the standard deviation is not less than 2, a relatively "quiet" or quiescent level was not able to be established, and the process repeats until the standard deviation falls below 2. An arbitrary threshold is then set at 10 bits above the baseline, which is then temporarily identified as the minimum bit count of the resolved and measured DC voltage at Vout that must be present in order for any vibration and/or noise to be considered as a possible fill valve 66 action. Green LED D4 then flashes twice, followed by red LED D2 flashing twice while piezo 311 also beeps twice, which alerts the user to flush the toilet. In the annunciation mode, Piezo1 is set at GND 315 potential by Port 6 in order to protect op-amp 325 from high voltage spikes, and Port 7 generates a square wave that causes piezo 311 to emit aubibly. In the sensing mode, Piezo 1 is left floating, or "open", and Piezo 2 is set at GND 315 potential.

When the user flushes the toilet, the resolved DC signal at Vout rises above the threshold. Block 804 is a decision block that is waiting for that event to occur. As long as the toilet is not flushed and the baseline does not exceed the threshold, processor 303 will continue to loop until the flush has been detected or exit the loop if 15 seconds have elapsed without a flush being detected (Block 812). Block 806 is in response to Vout surpassing the threshold, indicating a possible flushing of the toilet. Processor 303 then stores this A/D 10-bit measurement, increments the flush duration counter, and then waits 500 milliseconds. Block 808 determines if the Vout level bit count is above the threshold. If it is and Block 814 determines that the flush duration counter is less than 360, or 3 full minutes in time duration, the process will continue to loop through Blocks 806, 808, and 814, incrementing the flush duration counter every 500 milliseconds, until the resolved Vout signal either falls below the threshold or the flush duration counter exceeds 360. Well known in signal processing is the use of a digital Schmitt Trigger which is used to ensure that spurious or random noise that causes Vout to rise or fall temporarily above or below the threshold, depending upon what event is actually being timed or counted, does not result in the early termination of an event counter which, in this instance, is the flush duration counter. For example, if the resulting and resolved Vout bit count should fall below the threshold for two consecutive measurements due to the varying vibration and/or noise component produced by fill valve 66, and then rise above the threshold again as the flush action continues, the flush duration counter will continue incrementing without being reset.

Once the resolved Vout bit count falls below the threshold for four consecutive measurements, the flush cycle is determined to have concluded, as is identitifed in Block 810. The flush duration counter is then stored in memory. The accumulated resolved Vout bit counts are then averaged and also stored as the sensor average. The baseline bit count is then subtracted from the sensor average bit count, which then determines the average resolved DC level of a fill valve 66 action. A new calculated non-arbitrary threshold is then established, which represents a percentage of the average resolved DC level, as added to the baseline, and stored in memory. For example, assume a baseline of 400 bits and an average resolved DC level of the fill valve 66 action to be 560 bits. The new threshold would then be, as an example, twenty-five percent of that 160 bit span between the two numbers, as added to the baseline, or 440 bits. Summarily, the actual flush duration, the calculated non-arbitrary threshold, and the sensor average bit counts are now all known, having been empirically derived.

However, there are several instances that can result in those three variables not being initially established. The user may fail to flush the toilet, resulting in the Block 812 decision to not wait any longer for a flush to be detected than 15 seconds, and then defaulting to Block 816 values, which are preset in memory as default variables at the time of manufacturing. There could also be very heavy background noise, such as a nearby and very loud window fan, that is constantly forcing the resolved Vout bit count above the threshold for longer than 360 counts as shown in Block 814, which in turn would also then force a setting of default values in Block 816. In any instance where the processor 303 is unable to establish actual variables due to the empirical input of a fill valve 66 action during a flush, Block 816's default variables will be initially established, these variables having been empirically determined as the averages from many tested toilets. Block 816 also sets the "no flush detected" flag=1, indicating that a flush was not detected and/or mathematically defined, and that default variables will be used initially.

Block 818 indicates that actual monitoring and analysis of the toilet 50 is now ready to commence. Block 820 in FIG. 18B identifies the beginning of a cycle. Each cycle is 225 minutes in duration, and there are 6.4 cycles in each day. Processor 303 samples the Vout signal approximately every 500 milliseconds, so each cycle is also equal to 27,000 counts. Cycles are used so leak detector L can periodically set new baselines as a function of background noise, adapt to changes in fill valves and water pressure, allow cycles of low-current electronic "sleep" modes to preserve the battery, and also to provide a method whereby leak detector L can automatically reset itself once a leak has been detected and then repaired. At the beginning of each new cycle, Block 818 shows that a corresponding new baseline is determined.

Block 822 tests the battery 310. If the battery 310 is low, processor 303 will begin to flash the yellow LED D3 approximately every two minutes and also at the end of every detected flush cycle. A detected flush cycle is defined as the total time duration that resolved Vout was equal to, or exceeded, the threshold duration, with time boundaries established in software that "window" the threshold duration. If the total time duration of the resolved Vout fell within the window, that constitutes a detected flush cycle. Block 824 checks the "no flush detected" flag. If the flag=0, the flush was detected and the threshold can now be calculated accordingly, as shown in Block 826. If the "no flush detected" flag=1, Block 838 establishes the preset default variables for use in monitoring and analysis. Regardless of the variables used, Block 828 is then used to determine whether or not the leak detector L is actively monitoring and analyzing, or whether it is "sleeping" in the electronic power-down mode to preserve battery life. For the first ten days of operation, or 64 cycles of 225 minutes each, leak detector L is "on" and active every cycle. After 64 cycles, processor 303 "sleeps" in the low-power mode for two out of every three cycles, actively monitoring and analyzing during just one of every three consecutive cycles. It should be noted that processor 303 can also power down the analog circuitry, in addition to placing itself in the "sleep" mode, whereby it is later "woken up" by the watchdog timer, to conserve additional battery power. Because processor 303 can draw up to 500 microamperes while running on its internal clock at a speed of 4 megahertz, the power down "sleep" function, which reduces processor 303 current to under 1 microampere, is important with respect to extending the battery life.

Figure 18B:
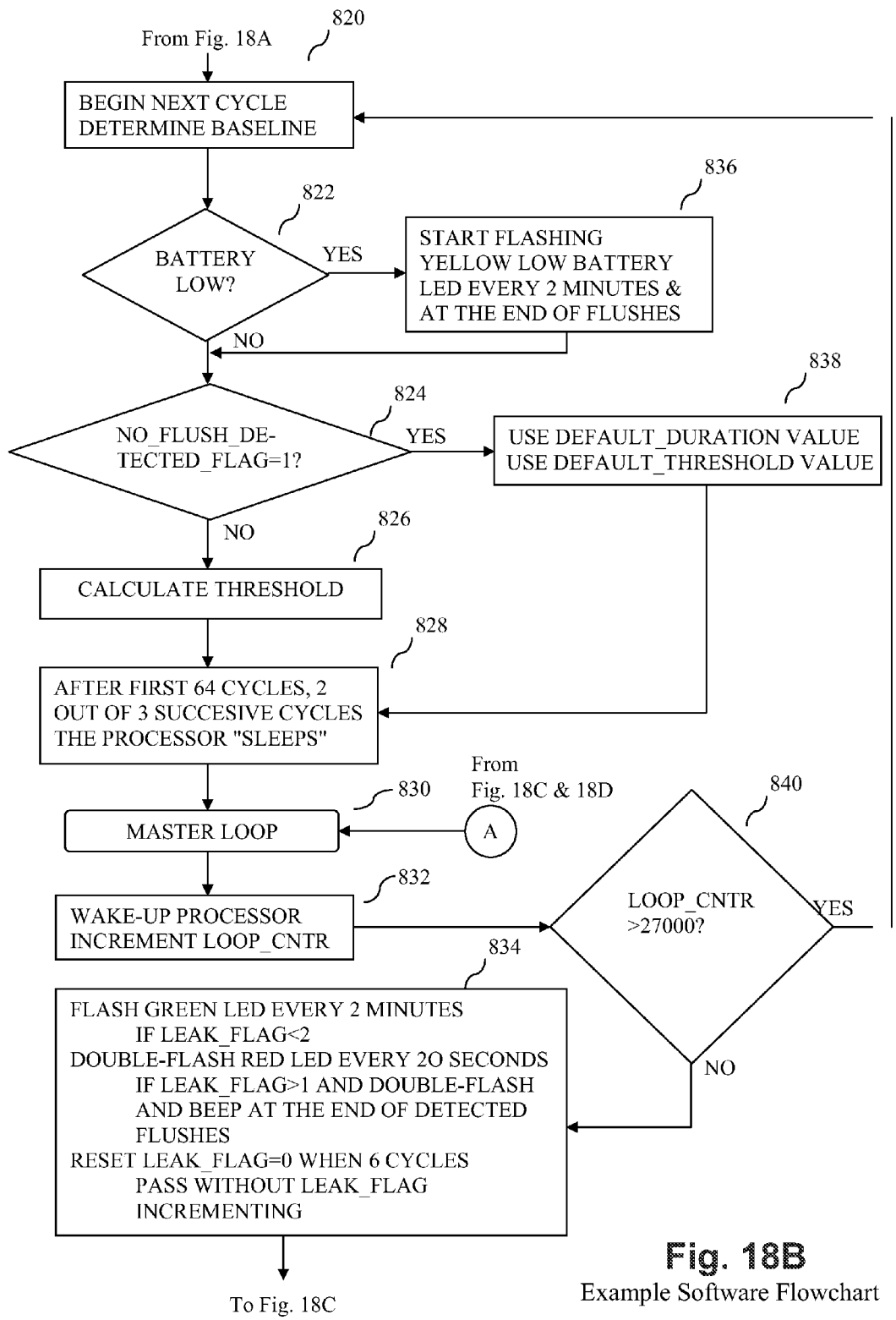
Figure 18C:
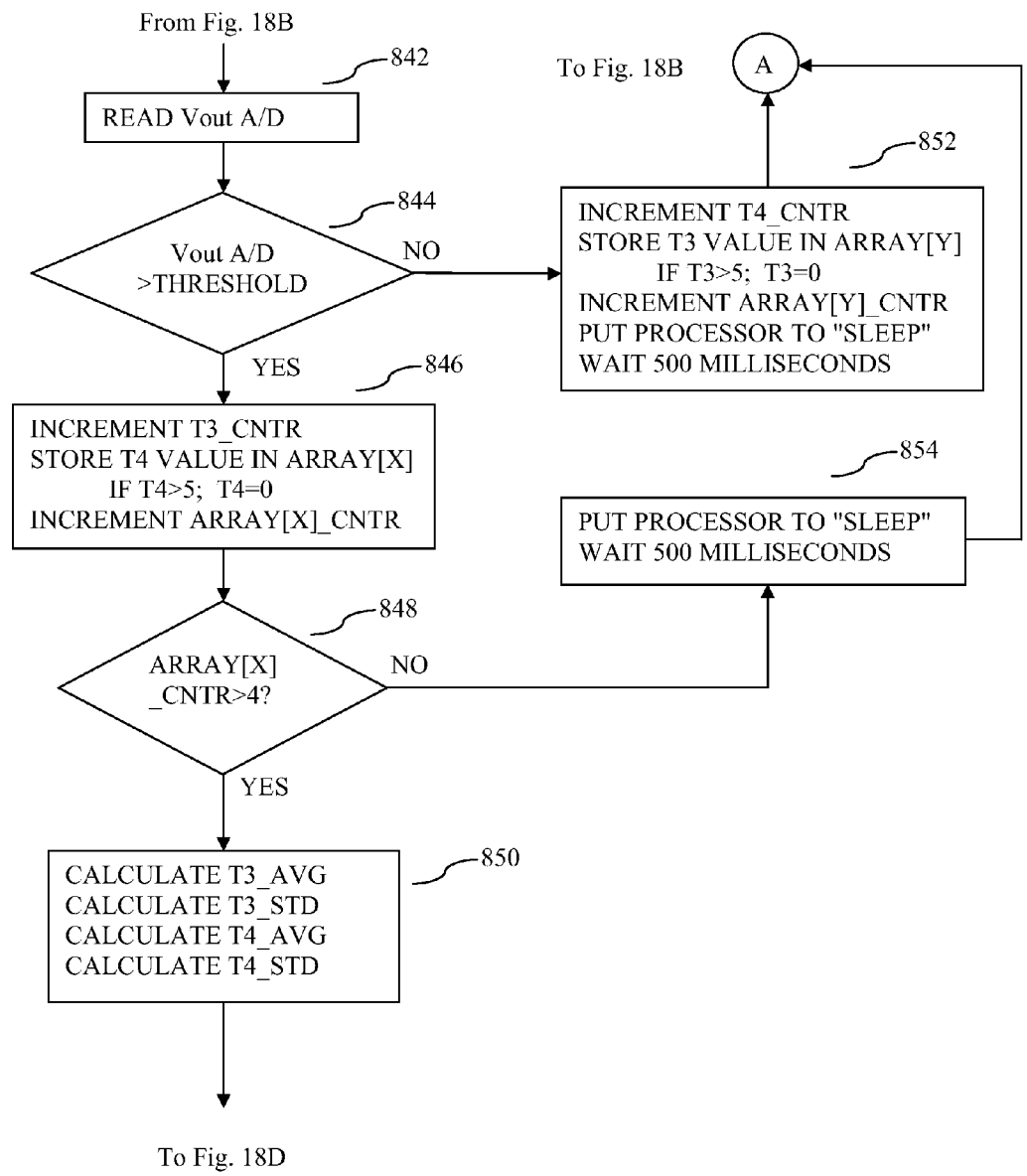

Block 830 in FIG. 18B shows the master loop of the given cycle commencing. Block 832 "wakes" the processor 303, if necessary, according to Block 828, and increments the loop counter that tracks the total amount of time of the given cycle, and ultimately terminates the same in order to begin a new cycle. Decision Block 840 tests the time elapsed in the current cycle and if it has reached 27,000, begins the next cycle by returning to Block 820, otherwise, Block 834 is executed. If the toilet 50 is not leaking at this point, processor 303 will flash the green LED D4 every two minutes and at the conclusion of detected flush cycles. If a leak has been detected, processor 303 will double-flash the red LED D2 every twenty seconds, and at the end of detected flush cycles, double-flash the red LED D2 and audibly annunciate piezo 311. The "leak flag" identified in Block 834 must be greater than 2 for processor 303 to qualify a leak, and this cumulative counter and flag is described in greater detail later in this section. Should the "leak flag" not increment at all over six consecutive cycles, it will be reset to zero. An intermittent leak may stop leaking for several days, resetting the "leak flag", while a leak that has been repaired by the user will also reset the "leak flag".

The Vout is A/D converted in Block 842. At this point it is necessary to understand the various counters and arrays in use prior to continuing on with the flowchart. FIG. 16B illustrates that time period T3 represents the continuous time duration whereby the resolved Vout is greater than the threshold. Time period T4 is therefore the continuous time duration whereby the resolved Vout is below the threshold. With respect to all sound and vibration that ultimately influences the sensor piezo 311 and analog sections 318 and 328 (FIG. 19), T3 and T4 are simply reduced to a threshold-separated logical data set where time is the secondary determinant and Vout amplitude the primary determinant.

Decision Block 844 determines if the resolved Vout is greater than the threshold. If it is, Block 846 increments the T3 counter while storing the T4 value, if it is greater than 5, in variable ARRAY[X], and makes the T4 counter equal to zero. The ARRAY[X] counter is also incremented, which only occurs when the T3 counter begins to increment. Basically, the T4 durations, which are those resolved Vout measurements below the threshold, are going to be stored in an ARRAY[X], where X identifies how many variables are in the array. If the ARRAY[X] counter is greater than 4 (Decision Block 848), Block 850 takes all of the variables stored as data in ARRAY[X] and ARRAY[Y], which represent the T4 and T3 data counters respectively, and mathematically averages each array while also mathematically determining the standard deviation, or STD, of each array. If ARRAY[X] counter is less than 4 (Decision Block 848), then after a delay of 500 milliseconds, the sequence of Block 830's master loop begins again.

Returning to Decision Block 844, if the resolved Vout is less than the threshold, Block 852 increments the T4 counter while storing the T3 value, if it is greater than 5, in variable ARRAY[Y], and making the T3 counter equal to zero. The ARRAY[Y] counter is also incremented, which only occurs when the T4 counter begins to increment. Basically, the T3 durations, which are those resolved Vout measurements above the threshold, are going to be stored in an ARRAY[Y], where Y identifies how many variables are in the array. After a delay of 500 milliseconds, the sequence of Block 830's master loop begins again.

The mathematical processes in Block 850 can only be executed once enough T3 and T4 datasets have been accumulated, which in the example shown is five, due to the arrays beginning numerically at zero. Until five datasets have been accumulated, no mathematical analysis is performed and the processor 311 continues to loop through the master loop.

Once five complete data sets have been collected, which can be thought of as alternating T3 and T4 data and as a function of whether or not the resolved Vout is above or below the threshold, the Decision Blocks in FIG. 18D can be executed. The first test is for spurious or randomly occurring noise, such as a nearby background conversation. If the total of the T3 average plus the T4 average is less than 20, as shown in Decision Block 856, Block 866 identifies the combined data sets as probably being due to noise or something other than a fill valve 66 action. In response to that noise, the threshold level is increased by 3 bits, and will continue to be incremented until the threshold is above the background noise level. Recall that a duration of 20 is equal to only 10 seconds, making such a low number virtually impossible to represent both a fill valve 66 action, or T3 duration, and a quiescent period, or T4 duration, combined.

Figure 18D:
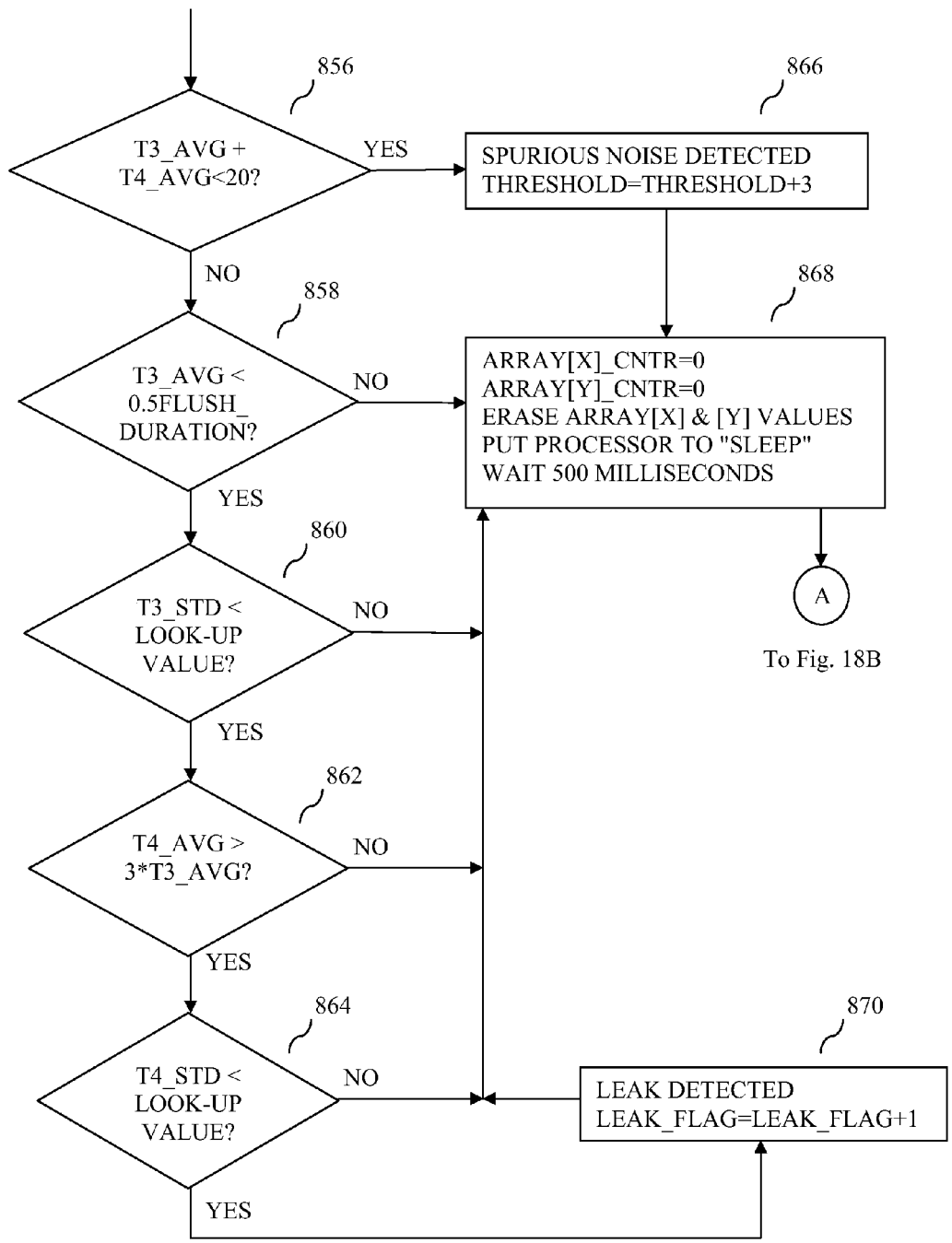

The next four Decision Blocks in FIG. 18D establish the test for a leaking flapper. If the T3 average is less than ½ of the flush duration, AND the T3 standard deviation is less than a value stored in processor 303's look-up table, AND the T4 average is greater than three times the T3 average, AND the T4 standard deviation is less than a value stored in the processor 303's look-up table, then toilet 50 is determined to be leaking and the "leak flag" shown in Block 870 is incremented. If any single Decision Block 858, 860, 862, or 864 tests negatively, they are processed by Block 868, which resets the array counters to zero and erases the existing array data, followed by a 500 millisecond delay before returning to master loop 830. Block 866, which earlier was identified as increasing the threshold by 3 bits due to spurious noise, is also processed by Block 868 before returning to master loop 30, as is Block 870 after incrementing the "leak detected" flag. The "leak detected" flag must be incremented to at least a value of 2 before processor 303 in Block 834 begins to alert the user with annunciators. The "leak detector" flag is only reset when 6 consecutive cycles have passed whereby the "leak detector" flag has not been incremented, meaning that the flag is not reset when a new cycle begins, and the flag is also cumulative over time.

Before explaining Decision Blocks 858, 860, 862, and 864 in further detail, it is first important to understand in simplest terms how a leak is qualified. With respect to unintended fill valve 66 actions, a repetitious or cyclically occurring series of T3 and T4 events that represent a leaking toilet 50 will be fairly consistent in time duration, while also falling within reasonable boundaries of time. Decision Block 858 fails the test for a leak if the T3 average, which represents the fill valve 66 action, is greater than one-half the flush duration time because it is virtually impossible for that scenario to occur. Decision Block 860 fails the test for a leak if the standard deviation of the T3 data set is too high, as this would indicate an inconsistent fill valve 66 action with respect to time. Decision Block 862 fails the test for a leak if the T4 average isn't at least three times the T3 average, because it takes much longer for tank 52 to drain than it does for fill valve 66 to refill the same with a leak simultaneously occurring. Decision Block 864 fails the test for a leak if the T4 standard deviation of the T4 data set is too high, as this would suggest wildly changing leak volumes over time, said leaks which are generally rather consistent with respect to volume leaked over time.

The following is an example of two data sets. The first one represents an average toilet 50, being used in a normal fashion, and exhibiting only intended fill valve 66 operations. The two rows of five numbers represent the T3 and T4 time durations:

| T3: | 56 | 58 | 59 | 58 | 60 | AVG: | 58.2 | STD: | 1.48 |
|---|---|---|---|---|---|---|---|---|---|
| T4: | 962 | 926 | 237 | 430 | 1792 | AVG: | 869.4 | STD: | 603.3 |

In the example above, it is easy to guess that the T3 data represents very consistent flushing of the toilet 50, particularly given a standard deviation of less than two. But the T4 data, or quiescent data, suggests that the time between T3 fill valve 66 actions is anything but consistent. A quick analysis suggests that the toilet was simply being used normally, and the T4 time durations simply representative of the time between uses and flushes. The next data set is representative of a leaking toilet 50:

| T3: | 23 | 24 | 24 | 25 | 23 | AVG: | 23.8 | STD: | 0.84 |
|---|---|---|---|---|---|---|---|---|---|
| T4: | 180 | 182 | 178 | 181 | 184 | AVG: | 181 | STD: | 2.24 |

In the example above it can be observed that T3 passes the Block 858 test and if the look-up table, as an example, had the number 2 for the standard deviation comparison, then Block 860 would also pass the test. Further, the T4 average clearly passes the Block 862 test, and assuming a look-up table value of 5, it would also pass the Block 864 test. It should be readily apparent that the unintended fill valve 66 action represented by the T3 data is very consistent, as is the amount of time that it takes for tank 52 to leak as represented by the T4. The look-up table values for the standard deviation comparisons made in Block 860 and 864 are a function of the T3 and T4 averages, in that the higher those averages, the larger the standard deviation can be for comparison purposes. One obvious reason for this is to account for the variations in water pressure than impact a single data set, leaving the standard deviation comparison windows too narrow if only one non-scaled variable were used for comparison, hence the look-up table.

Non-limiting variations on the example cited above include using only the T3 data for determining and qualifying leaks; using a pushbutton reset in the hardware (FIG. 19) to force a reset or allow user input, as opposed to automatically resetting and/or permitting user-selectable or programmable parameters; using time-based and amplitude-based algorithms to detect a wide-open flapper 62; and storing data relative to the number of toilet 50 flushes, volume of intended and unintended water use, and total time durations of each.

Exemplary Illustrative Non-Limiting Circuit Description, Operation, & Piezo Function The exemplary illustrative non-limiting electronic design should be inexpensive to manufacture, have a small physical footprint so that the resulting product is also small, and function reliably on a single battery preferably for a while (e.g., at least 12 months) without replacement. Thus, in more detail, the FIG. 17 block diagram of such an exemplary circuit senses the fill valve base port 200 produced vibration 201 using the vibration or acoustic transducer 300, preferably responding to the translational vibration and/or frequencies conducted or radiated through and by the water W, tank air 201, and toilet porcelain 202. The output of transducer 300 feeds high gain amplifier 301 that may or may not include active or passive filtering to block noise that is unrelated to the actual toilet 50 operation. The now amplified signal is then processed by a signal rectifier and low pass filter 302, which produces a relatively smooth DC level in amplitude response to the transducer 300. The DC level is then fed into a port of processor 303 that is the input stage of an internal A/D converter, where said DC level is converted to a representative and corresponding bit count. The processor 303 uses the bit count information for decisionmaking that results in the activation of the LED's or other annunciators 304 and/or the control of optional telemetry transmitter or transceiver 305. Two variations of the block diagram shown in FIG. 17 are detailed as electronic circuits in FIGS. 19 and 20.

FIG. 19 depicts an exemplary illustrative non-limiting circuit operating from a 3 volt source, such as a 20 millimeter Panasonic BR2032 lithium battery 310, shown mechanically in FIG. 7. Such batteries are capable of providing from 200 to 250 milliampere hours of current over the operating life of the battery.

The transducer 300 shown can be a 15 or 20 millimeter passive piezoelectric annunciator 311, used as a sensor, that is commonly and inexpensively available from many companies, such as Murata and Projects Unlimited. A piezoelectric sensor is a device that uses the well-known piezoelectric effect to measure pressure, acceleration, strain or force, by converting these physical properties into a corresponding electrical signal. Although inexpensive piezos and annunciators are well-known for generating mechanical vibration and thus producing sound waves, when subjected to electrical signal stimulation, these same devices, when subjected to mechanical stress—such as vibration, sound waves, or impact—will produce a small electric current in response, as is done in one exemplary embodiment where the piezo 311 functions as both sensor and audible transducer.

In the exemplary illustrative implementation, the piezo 311 is firmly secured to printed circuit board 312 and compressed between the enclosure top 350 and enclosure base 325 creating both a resonant cavity 360 (FIG. 6) and method by which translational vibration of the toilet 50, however it occurs, is both conducted and radiated onto, or into, piezo 311.

Figure 21A:
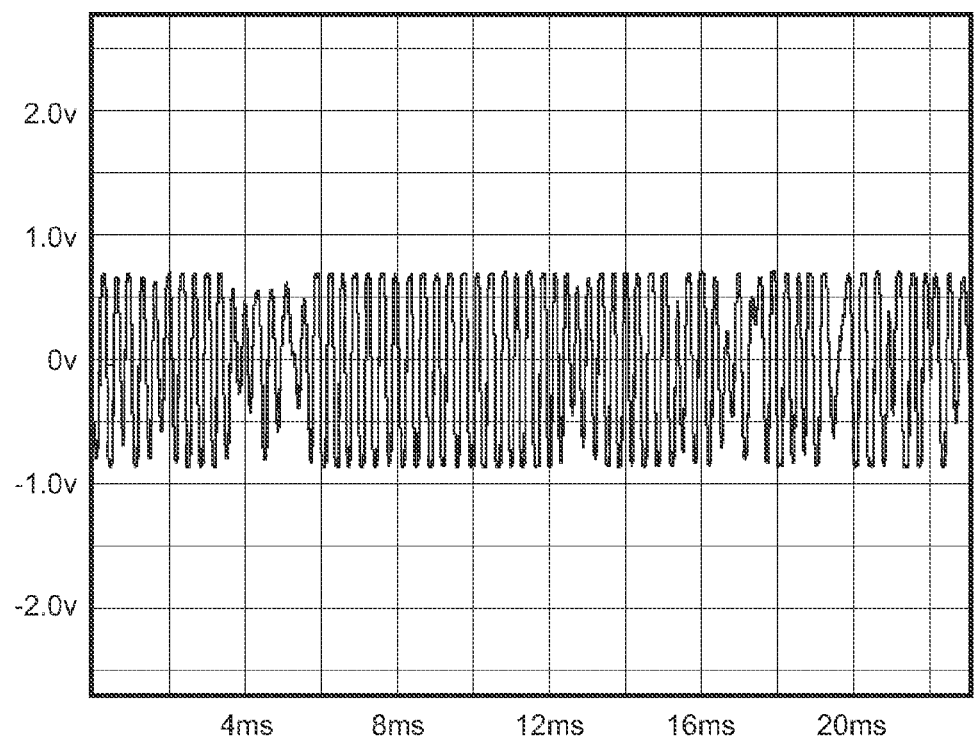
FIG. 21A is a detailed representation of an example unfiltered analog signal produced by the exemplary illustrative non-limiting leak detector L's sensor and amplifier during a normal fill valve action with a water supply pressure of approximately 60 PSI and a flow rate of approximately 6 GPM.

Referencing the circuit in FIG. 19, when Piezo2 is at ground potential and Piezo1 is left floating, Piezo 311 generates a small electrical current in response to the mechanical stress and strain it undergoes, which is amplified by op-amps 325 and 326, both configured as inverting amplifiers with a combined fixed gain that can range from approximately 100 to 1000, depending upon the sensitivity and output of the type of piezo 311 selected. Op-amps (operational amplifiers) can be constructed in any number of configurations well-known to electronic designers. Such an amplifier might also contain filtering characteristics in the input or feedback loops in order to limit noise and increase signal. FIG. 21A shows one example of the amplified output of op-amp 326, which is then rectified by diode 327, and filtered by RC network 328, which produces a corresponding DC level. The DC level, or amplitude, generally represents the average amplified electrical signal produced by piezo 311.

The DC level is then fed into processor 303's A/D port Vout, where the signal can be converted into a corresponding bit count for further processing. Processor 303 uses the processed information to illuminate LED's D2, D3, and D4, activate audible annunciators (which is piezo 311, when Piezo1 is at ground potential to protect op-amp 325 and Piezo2 is square wave produced by processor 303), signal external devices, control external devices, and/or transmit and/or receive telemetry data.

Figure 20:
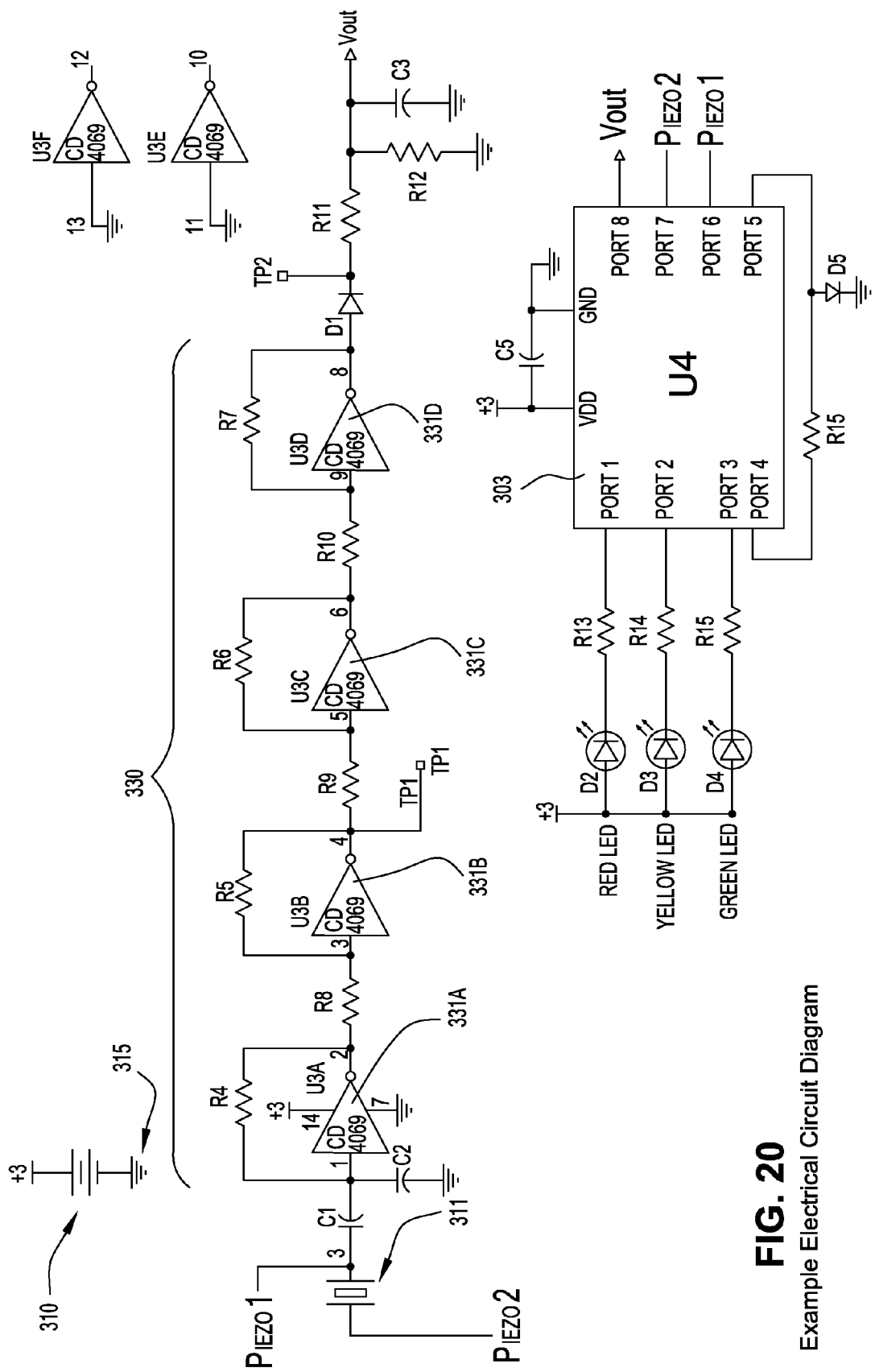

FIG. 20 shows a similar circuit that uses a different type of amplifier. Linear amplifier 330 is comprised of several standard unbuffered CMOS inverter gates 331A-331D, such as the well known CD4069UB, manufactured by Texas Instruments and other semiconductor manufacturers. Acting as a 4-stage linear amplifier, the circuit performs essentially the same function as op-amps 325 and 326, and is also inexpensive.

Expanding on the electrical characteristics of the circuitry and using FIG. 19 as the example schematic, FIGS. 21A through 25B show example waveforms at various circuit points in response to an electrical signal produced by piezo 311.

Figure 21B:
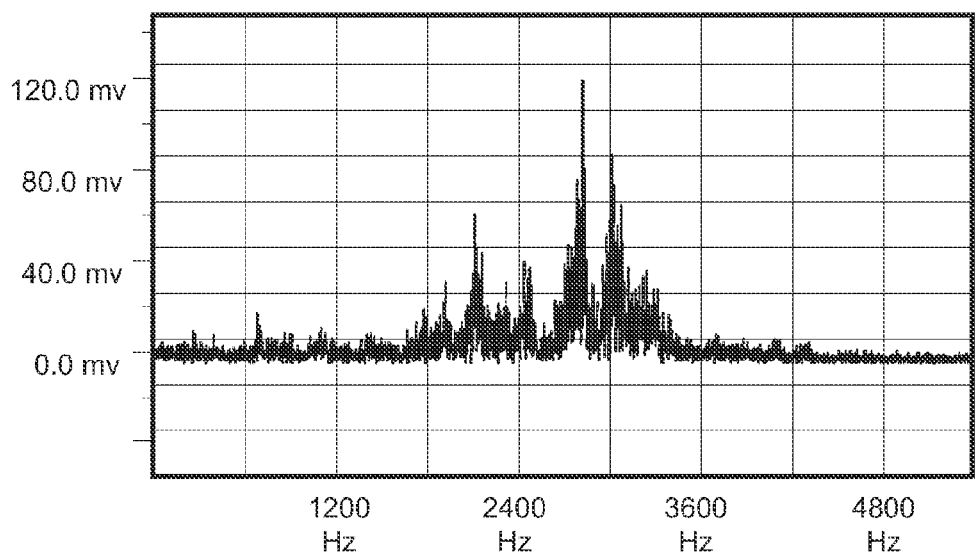
FIG. 21B is a detailed representation of an example spectral power bandwidth of the analog signal of FIG. 21A.

FIG. 21A is a detailed representation of an example unfiltered analog signal produced by the exemplary illustrative non-limiting conservation device's sensor and amplifier during a normal fill valve action over a time span of approximately 23 milliseconds, as it appears at the output of op-amp 326, with a water supply pressure of approximately 60 PSI and a flow rate of approximately 6 GPM. FIG. 21B is a detailed representation of an example spectral power bandwidth of the analog signal of FIG. 21A, as seen on a conventional spectrum analyzer. The piezo 311 used has a center frequency of 2.000 kilohertz and the leak detection device-under-test L was mounted in the position shown in FIG. 1A during measurement.

Figure 22A:
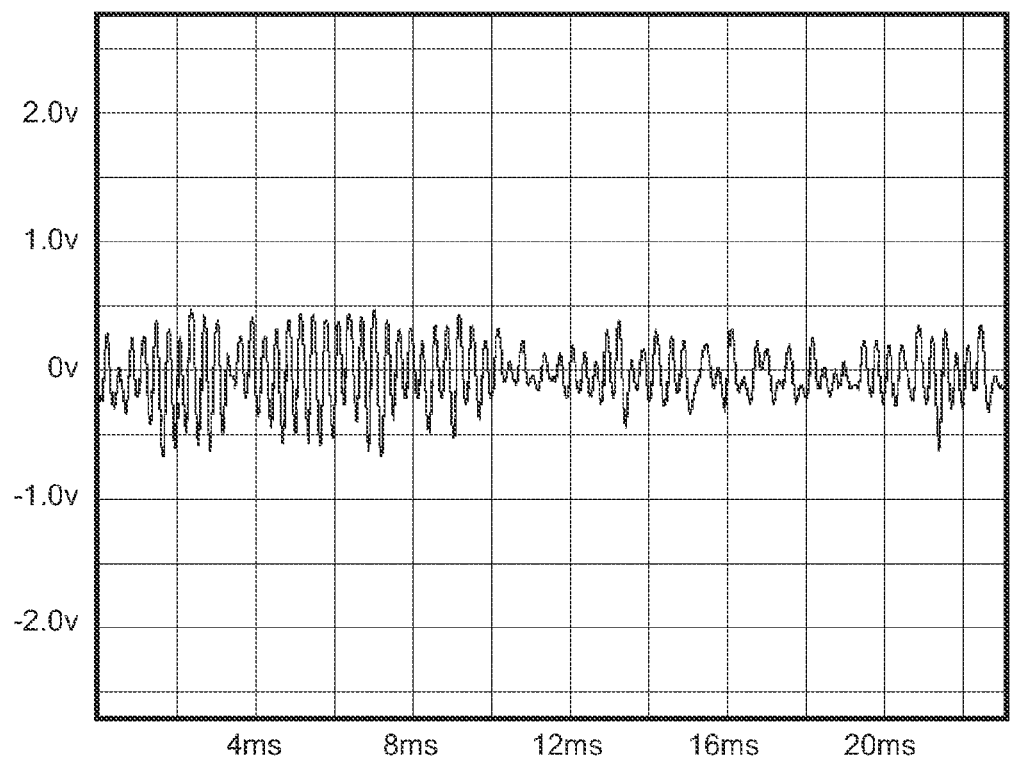
FIG. 22A is a detailed representation of an example unfiltered analog signal produced by the exemplary illustrative non-limiting leak detector L's sensor and amplifier during a normal fill valve action with a water supply pressure of approximately 45 PSI and a flow rate of approximately 3.5 GPM.
Figure 22B:
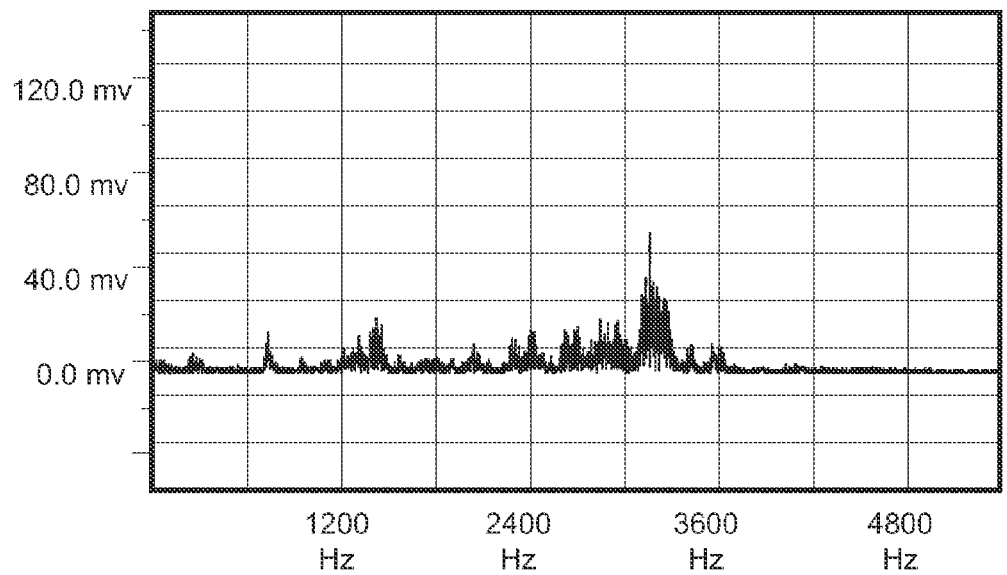
FIG. 22B is a detailed representation of an example spectral power bandwidth of the analog signal of FIG. 22A.

FIGS. 22A and 22B are identical to FIGS. 21A and 21B, except that the water supply pressure and flow rates have been reduced to 45 PSI and 3.5 GPM, respectively. The nomenclature on the graphs is identical, showing the amplitude difference between FIGS. 21A and 22A, while the center frequency of approximately 3.0 kilohertz remains the same in 21B and 22B, although the overall power bandwidth is reduced in 22B.

Figure 23A:
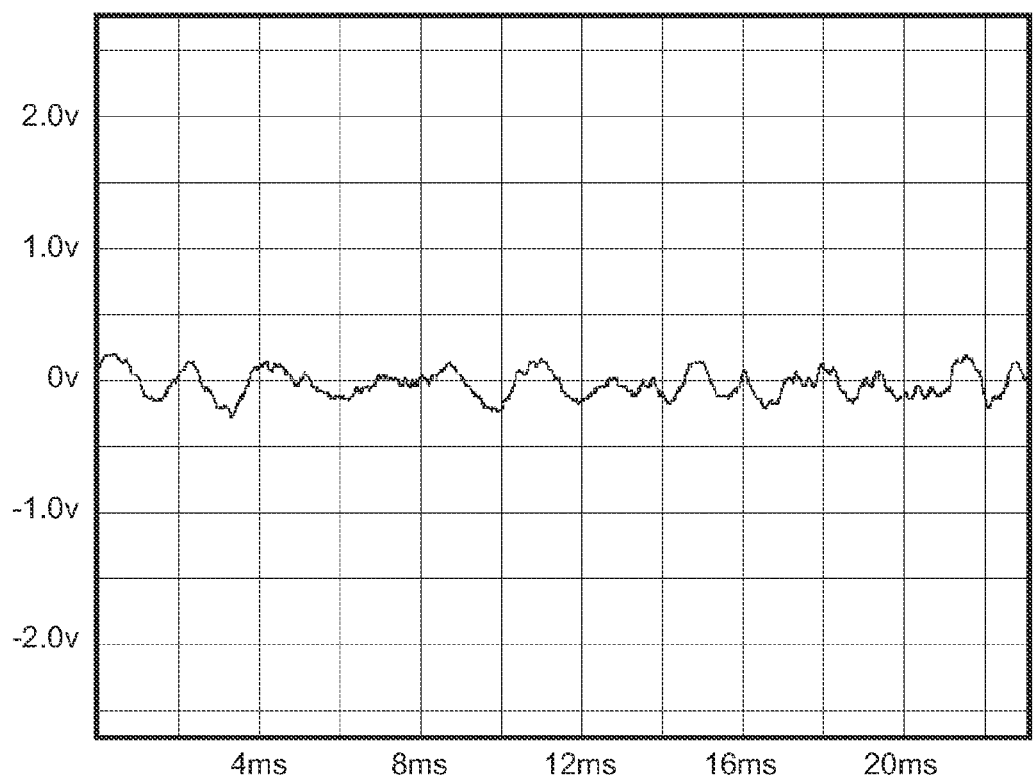
FIG. 23A is a detailed representation of an example unfiltered analog signal produced by the exemplary illustrative non-limiting leak detector L's sensor and amplifier when a stream of liquid, such as urine, is striking the surface of the water in the toilet bowl.
Figure 23B:
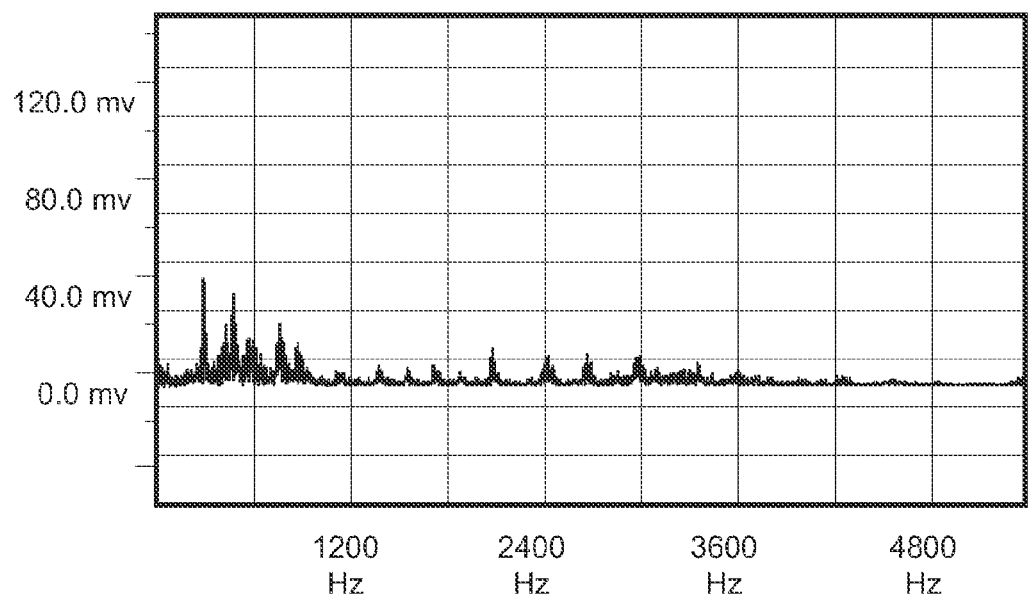
FIG. 23B is a detailed representation of an example spectral power bandwidth of the analog signal of FIG. 23A.

FIG. 23A is a detailed representation of an example unfiltered analog signal produced by the exemplary illustrative non-limiting conservation device's sensor, as it appears at the output of op-amp 326, when a stream of liquid, such as urine, is striking the surface of the water in the toilet bowl 54. FIG. 23B is a detailed representation of an example spectral power bandwidth of the analog signal of FIG. 23A. In addition to the significant total amplitude represented in FIG. 23A, the spectral center frequency has shifted to approximately 600 hertz, which is a far lower frequency than is generally represented by a fill valve 66 action.

Figure 24A:
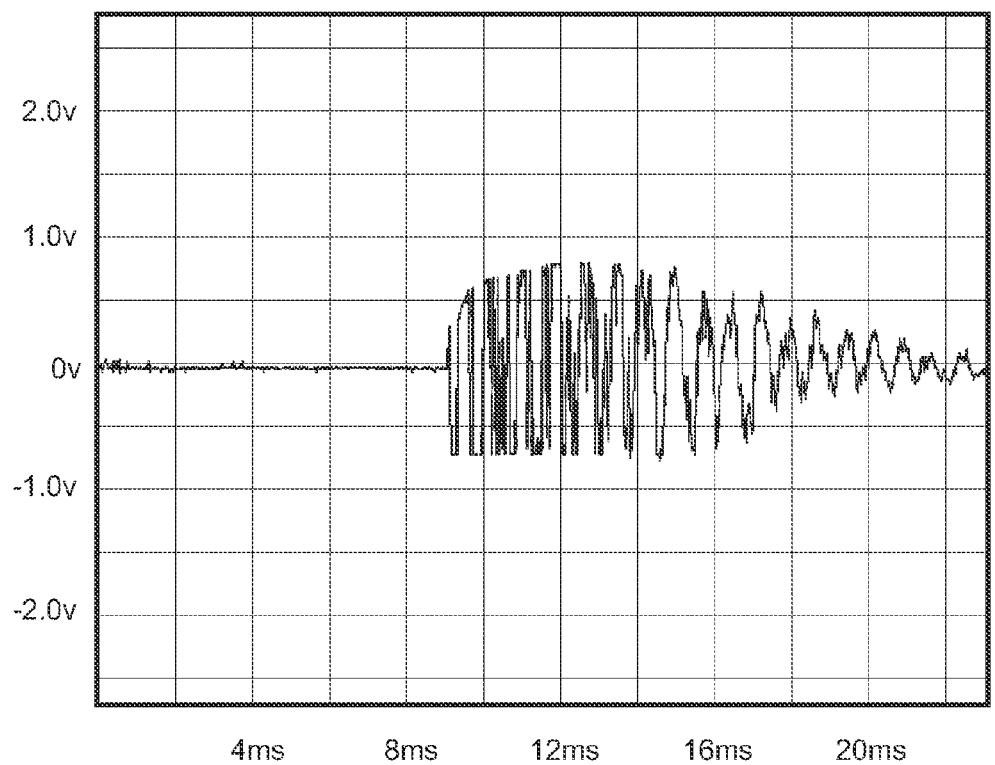
FIG. 24A is a detailed representation of an example unfiltered analog impulse response signal produced by the exemplary illustrative non-limiting leak detector L's sensor and amplifier due to a single brief hard contact on the outside of a toilet tank.
Figure 24B:
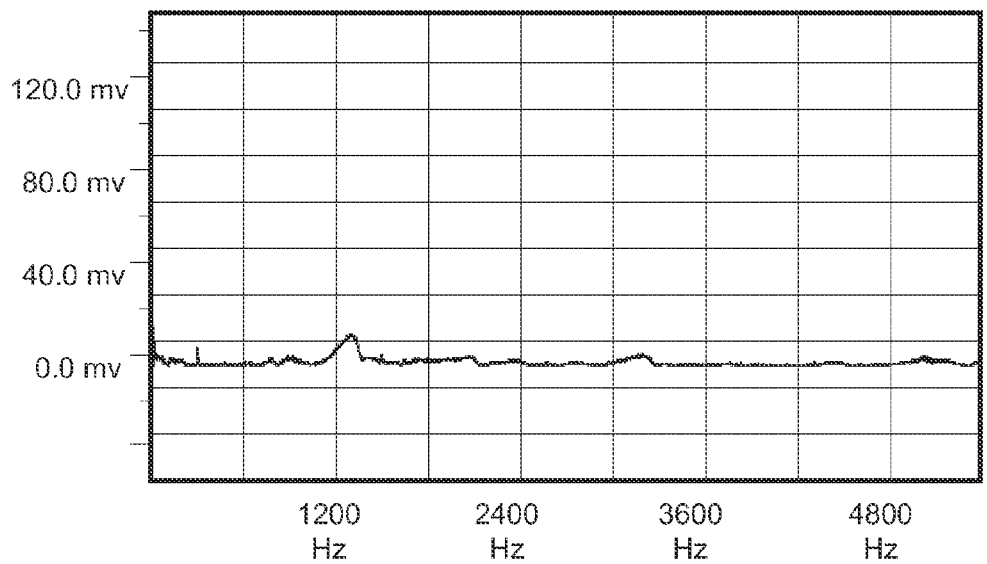
FIG. 24B is a detailed representation of an example spectral power bandwidth of the analog signal of FIG. 24A.

FIG. 24A is a detailed representation of an example unfiltered analog impulse response signal produced by the exemplary illustrative non-limiting conservation device's sensor, as it appears at the output of op-amp 326, due to a single brief hard contact on the outside toilet tank 52. FIG. 24B is a detailed representation of an example spectral power bandwidth of the analog signal of FIG. 24A. The rectified and filtered response of FIG. 24A, as viewed at the output of filter 328 in FIG. 19, results in little more than a DC "blip" when resolved by the processor 303's analog-to-digital converter. Further, FIG. 24B shows a very low spectral power bandwidth overall, with the center frequency of approximately 1200 hertz.

Figure 25A:
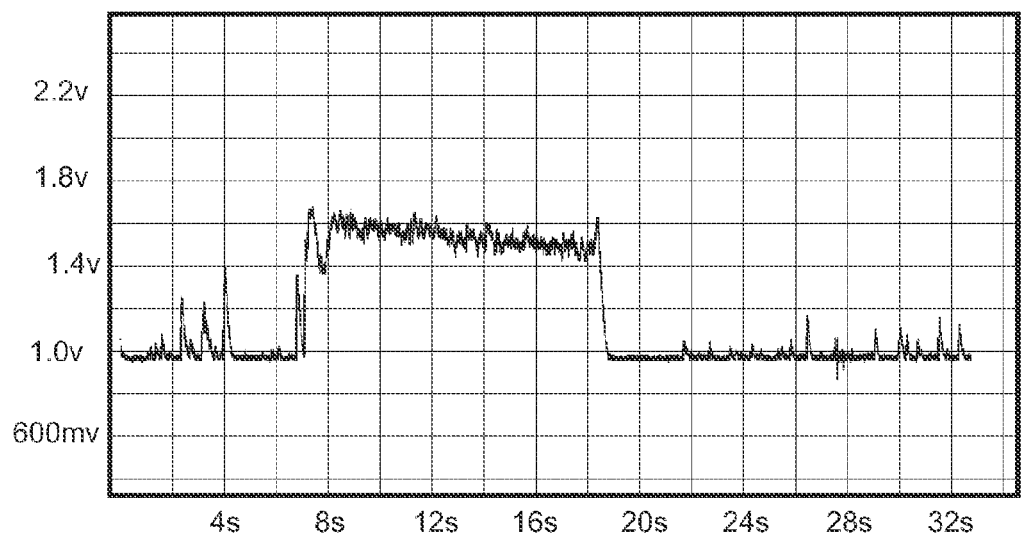
FIG. 25A is a detailed representation of an example filtered analog signal produced by the exemplary illustrative non-limiting leak detector L's sensor and amplifier, rectified to form a DC level, in response to the complete duration of the fill valve action as represented in FIG. 21A.
Figure 25B:
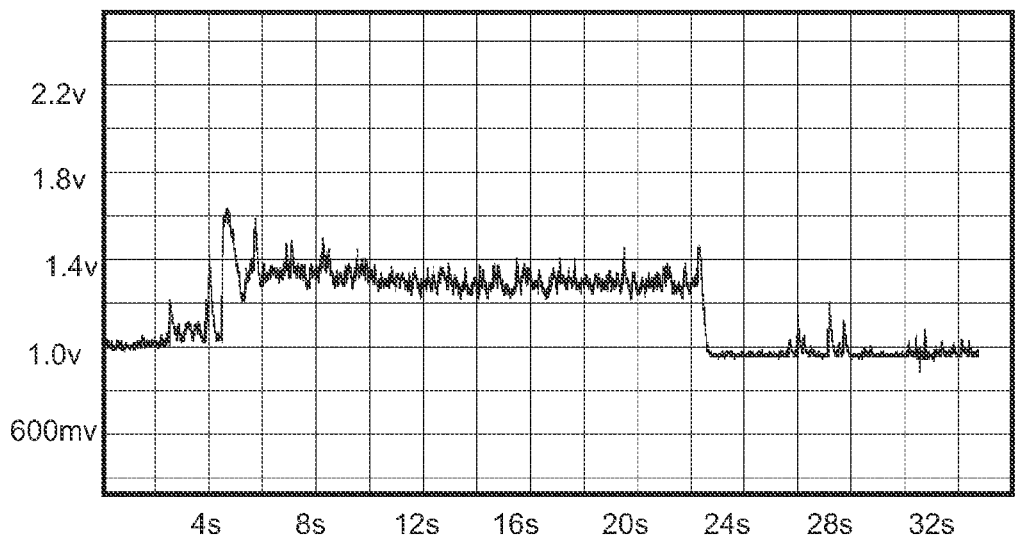
FIG. 25B is a detailed representation of an example filtered analog signal produced by the exemplary illustrative non-limiting leak detector L's sensor and amplifier, rectified to form a DC level, in response to the complete duration of the fill valve action as represented in FIG. 22A.

FIGS. 25A and 25B are the detailed representations of the example filtered analog signals produced by the exemplary illustrative non-limiting conservation device's sensor and amplifier, rectified to form a DC level, as viewed at the output of filter 328 in FIG. 19, in response to the complete duration of the fill valve action as represented in FIGS. 21A and 21B, respectively.

It is therefore disclosed that a further embodiment is the use of a Digital Signal Processor (DSP) or analog circuitry capable of performing similar tasks to isolate the resulting vibration and/or sound produced by the intended or unintended fill valve 66 action, combined with time measurements, to determine such toilet activities as flushes, leaks, total water flow, and all other characteristics identified and/or previously described in the body of this disclosure.

Both FIG. 19 and FIG. 20 examples draw less than 15 microamperes in total current drain by the analog circuitry, providing at least 12 to 18 months of operation from BR2032-type battery. By periodically putting the processor and analog circuitry to sleep during random or predetermined timed cycles—a function that dramatically limits the processor functionality while temporarily disabling the piezo 311 and op-amp 325 and 326 inputs—the total current drain can be reduced to less than 1 microampere, allowing the unit to operate for up to several years on a single battery.

Other sensors that can be used to detect vibration or sound could be, but are not limited to, electret microphones, magnetic transducers, solid state single and multi-axis transducers, and self-contained printed circuit board-mounted surface mount or through-hole piezo electric devices. It is further disclosed that the same piezo that senses vibration and or acoustic noise can also be used to generate sound, such as to audibly alert the user to a leaking toilet or the need to replace the battery.

Sensing analog electronics could also include comparators or transistor amplifiers, which could directly or indirectly (via passive or active signal processing) be fed directly into the processor as either a digital signal (as in the case of a standard comparator output) or analog voltage that could be resolved by the processor's A/D converter.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A toilet monitoring device for determining when a toilet of the type having a fill valve is leaking, the toilet monitoring device comprising:

a sensor that in use produces a signal having an amplitude corresponding to sound and/or vibration detected by the sensor; and an electronic circuit to receive and process the signal, the electronic circuit being configured to (a) periodically sample the amplitude of the electrical signal and determine an average amplitude (b) establish a comparative threshold in response to the determined average amplitude, (c) compare the signal amplitudes with the comparative threshold to determine time durations (T3) for which the amplitude of the signal exceeds the comparative threshold and time durations (T4) for which the amplitude of the signal is below the comparative threshold, (d) compare an average value of T3 to a stored user initiated fill valve activity time duration threshold (T1) and if T3 is less than T1, (e) compare the average value of T3 to an average value for T4 and if T3 is less than T4, (f) provide an indication of a toilet fill valve leak.

2. The device of claim 1 wherein said sensor is, in use, mounted on an external surface of the toilet so as to be acoustically and/or vibrationally coupled to the toilet.

3. The device of claim 1 wherein said sensor comprises a piezo-electric sensor.

4. The device of claim 1 wherein said electronic circuit is further configured to detect intermittent leaks and produces an alert as the indication.

5. The device of claim 1 wherein said electronic circuit in use accepts no user input.

6. The device of claim 1 wherein said electronic circuit is further configured to actuate said sensor to cause said sensor to audibly emit said indication.

7. The device of claim 1 wherein said electronic circuit is further configured to operate in a learn mode that adaptively models the characteristics and operations of a particular toilet.

8. The device of claim 1 wherein said electronic circuit includes a microcomputer.

9. The device of claim 1 wherein said electronic circuit is further configured to intermittently operate in a sleep mode to conserve power.

10. The device of claim 1 wherein said electronic circuit includes a display that is configured to visually provide the indication.

11. The device of claim 10 wherein said display comprises at least one light emitting diode.

12. The device of claim 10 wherein said display comprises an array of light emitting diodes.

13. The device of claim 1 further including a housing, said sensor and said electronic circuit being disposed within said housing, said housing being configured to be adhesively removably attachable to the outside of a toilet tank.

14. The device of claim 1 wherein said electronic circuit is configured to be dynamically adaptable to changing baseline operational characteristics of the toilet.

15. The device of claim 1 wherein said electronic circuit is configured to perform statistical standard deviation and averaging analysis on said time durations.

16. A method for monitoring a toilet of the type having a fill valve to determine whether the toilet is leaking, the method comprising:
producing an electrical signal having an amplitude corresponding to sound and/or vibration detected by a sensor;
periodically sampling the amplitude of the electrical signal,
determining an average amplitude, establishing a comparative threshold in response to the determined average amplitude;
with a processor, comparing the signal amplitudes with the comparative threshold to determine time durations (T3) for which the amplitude of the signal exceeds the comparative threshold and time durations (T4) for which the amplitude of the signal is below the comparative threshold;
with the processor, determining whether the detected event time durations represent a consistent and repetitious series of events indicative of repeated operations of the fill valve due to toilet leakage, including comparing an average value of T3 to a stored user initiated fill valve activity time duration threshold (T1) and if T3 is less than T1, and comparing the average value of T3 to an average value for T4 and if T3 is less than T4, thereby discriminating toilet-generated noise from noise not generated by the toilet and detecting cyclical operation of the toilet that was not initiated by a user; and
automatically producing a humanly-perceivable indication of a toilet fill valve leak in response to said discriminating.

17. The method of claim 16 further including acoustically and/or vibrationally coupling a sensor to an outer surface of the toilet.

18. The method of claim 16 further including mechanically actuating a piezo-electric sensor to produce the sensor signal.

19. The method of claim 16 further including detecting intermittent leaks and producing said indication in response thereto.

20. The method of claim 16 further including actuating a sensor to cause said sensor to emit said alert as an audible indication.

21. The method of claim 16 further including operating in a learn mode that models characteristics of the toilet.

22. The method of claim 16 further including operating in a sleep mode to conserve power.

23. The method of claim 16 further including providing a visual indication.

24. The method of claim 16 further including adhering a water-resistant housing to the outside of a toilet tank and producing the sensor signal from within the housing.

25. The device of claim 16 further including analyzing said sensor signal to determine leakage based on unintended water inflow.

26. The method of claim 16 further including dynamically adapting a detection algorithm to changing characteristics of water flow into the toilet.

27. The method of claim 16 further including performing statistical analysis on said sensor signal.

28. A method of detecting unintended inflow of water into the tank of a flush toilet of the type having a tank having a fill valve therein, comprising:
measuring, with a sensor disposed outside of the tank of the flush toilet and not in contact with any water the toilet tank contains, at least one characteristic associated with water inflow into a toilet tank, the sensor producing an electrical signal having an amplitude corresponding to sound and/or vibration detected by the sensor;
periodically sampling the amplitude of the electrical signal and determining an average amplitude,
establishing a comparative threshold in response to the determined average amplitude;
with the electronic circuit, comparing the signal amplitudes with the comparative threshold to determine time durations (T3) for which the amplitude of the signal exceeds the comparative threshold and time durations (T4) for which the amplitude of the signal is below the comparative threshold,
processing, with the electronic circuit, said determined time durations to compare an average value of T3 to a stored user initiated fill valve activity time duration threshold (T1) and if T3 is less than T1 and to compare the average value of T3 to an average value for T4 and if T3 is less than T4, to thereby determine whether the time duration comparisons are indicative of a consistent and repetitious series of events characteristic of repeated operations of the fill valve due to toilet leakage, thereby distinguishing toilet events from other disturbances and detecting, with the electronic circuit, when water inflow into said toilet tank is not initiated by a user flushing said toilet and providing an indication of a toilet fill valve leak.

29. The method of claim 28 wherein said measuring comprises detecting vibration or acoustic noise.

30. The method of claim 28 wherein said measuring comprises measuring vibration generated when a fill valve allows water to flow into the toilet tank.

31. The method of claim 28 wherein said flush toilet includes a flapper valve, and said determining determines leaking of the type caused by a faulty flapper valve.

32. The method of claim 28 wherein said measuring comprises detecting a response to vibration or acoustic noise.

33. A method of detecting water flow into a toilet having a tank and a fill valve, said method comprising:
  using a sensor to produce an electrical signal having an amplitude corresponding to sound and/or vibration detected by the sensor;
  periodically sampling the amplitude of the electrical signal and determining an average amplitude;
  detecting, with a processing circuit coupled to the sensor, successive periods during which the fill valve opens to allow water to flow into the toilet tank, including establishing a comparative threshold in response to the determined average amplitude, and comparing the signal amplitudes with the comparative threshold to determine time durations (T3) for which the amplitude of the signal exceeds the comparative threshold and time durations (T4) for which the amplitude of the signal is below the comparative threshold;
  with the processing circuit, comparing an average value of T3 to a stored user initiated fill valve activity time duration threshold (T1) and if T3 is less than T1, comparing the average value of T3 to an average value for T4 and if T3 is less than T4, thereby determining whether the time durations comprise a consistent and repetitious series of events characteristic of repeated operations of the fill valve due to toilet leakage and distinguishing, with the processing circuit in response to said time durations, toilet events indicative of toilet leakage from disturbances external to the toilet and from user-initiated toilet events; and
  based on said determining, providing an indication of a toilet fill valve leak.

34. The method of claim 33 wherein said sensor performs monitoring of acoustic noise or vibration and said determining determines that said water flow is cyclical and therefore not initiated by users of the toilet.

35. The method of claim 33 wherein said sensor performs detecting of vibration generated when said fill valve allows water to flow into the toilet tank.

36. The method of claim 33 wherein said comparing comprises determining whether successive time durations are at least substantially equal.

37. The method of claim 33 wherein said flush toilet includes a flapper valve, and said determining determines leaking consistent with a defective flapper valve.

* * * * *